(12) United States Patent
Sasaki et al.

(10) Patent No.: US 12,174,608 B2
(45) Date of Patent: Dec. 24, 2024

(54) INFORMATION PROCESSING APPARATUS, METHOD OF CONTROLLING INFORMATION PROCESSING APPARATUS, PRODUCTION SYSTEM, METHOD OF MANUFACTURING ARTICLE, AND RECORDING MEDIUM

(71) Applicant: CANON KABUSHIKI KAISHA, Tokyo (JP)

(72) Inventors: Tomonori Sasaki, Tokyo (JP); Hiroyuki Ueda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 454 days.

(21) Appl. No.: 17/387,808

(22) Filed: Jul. 28, 2021

(65) Prior Publication Data

US 2022/0035332 A1 Feb. 3, 2022

(30) Foreign Application Priority Data

Jul. 31, 2020 (JP) .................. 2020-130743

(51) Int. Cl.
*G05B 19/05* (2006.01)
*G06F 3/14* (2006.01)

(52) U.S. Cl.
CPC ............. *G05B 19/058* (2013.01); *G06F 3/14* (2013.01); *G05B 2219/13144* (2013.01)

(58) Field of Classification Search
None
See application file for complete search history.

(56) References Cited

U.S. PATENT DOCUMENTS

| | | | |
|---|---|---|---|
| 2004/0225955 A1* | 11/2004 | Ly | G06Q 10/06 715/255 |
| 2008/0180707 A1* | 7/2008 | Kanematsu | G06T 7/00 358/1.9 |
| 2008/0184114 A1* | 7/2008 | Hano | B29C 45/76 715/700 |
| 2012/0194579 A1* | 8/2012 | Fujinaga | H04N 1/2353 347/5 |
| 2020/0051181 A1* | 2/2020 | Moritomo | G06Q 50/04 |
| 2021/0011463 A1* | 1/2021 | Koh | G05B 19/4183 |

FOREIGN PATENT DOCUMENTS

| | | | | |
|---|---|---|---|---|
| JP | H0926805 A | | 1/1997 | |
| JP | 2008097096 A | | 4/2008 | |
| JP | 2009009399 A | | 1/2009 | |
| JP | 2010170339 A | | 8/2010 | |
| JP | 2019002646 A | * | 1/2019 | ......... H03K 19/1732 |
| JP | 2020024681 A | | 2/2020 | |
| WO | WO-2016170603 A1 | * | 10/2016 | ............ G05B 19/05 |
| WO | WO-2018087864 A1 | * | 5/2018 | ........... G05B 19/418 |

* cited by examiner

*Primary Examiner* — David Earl Ogg
(74) *Attorney, Agent, or Firm* — Canon U.S.A., Inc. IP Division

(57) ABSTRACT

Provided is an information processing apparatus for displaying a state of a machine facility including a plurality of devices, on a display unit. An operation time for an operation of one predetermined device among the plurality of devices and signals relating to the operation are displayed on the display unit.

23 Claims, 18 Drawing Sheets

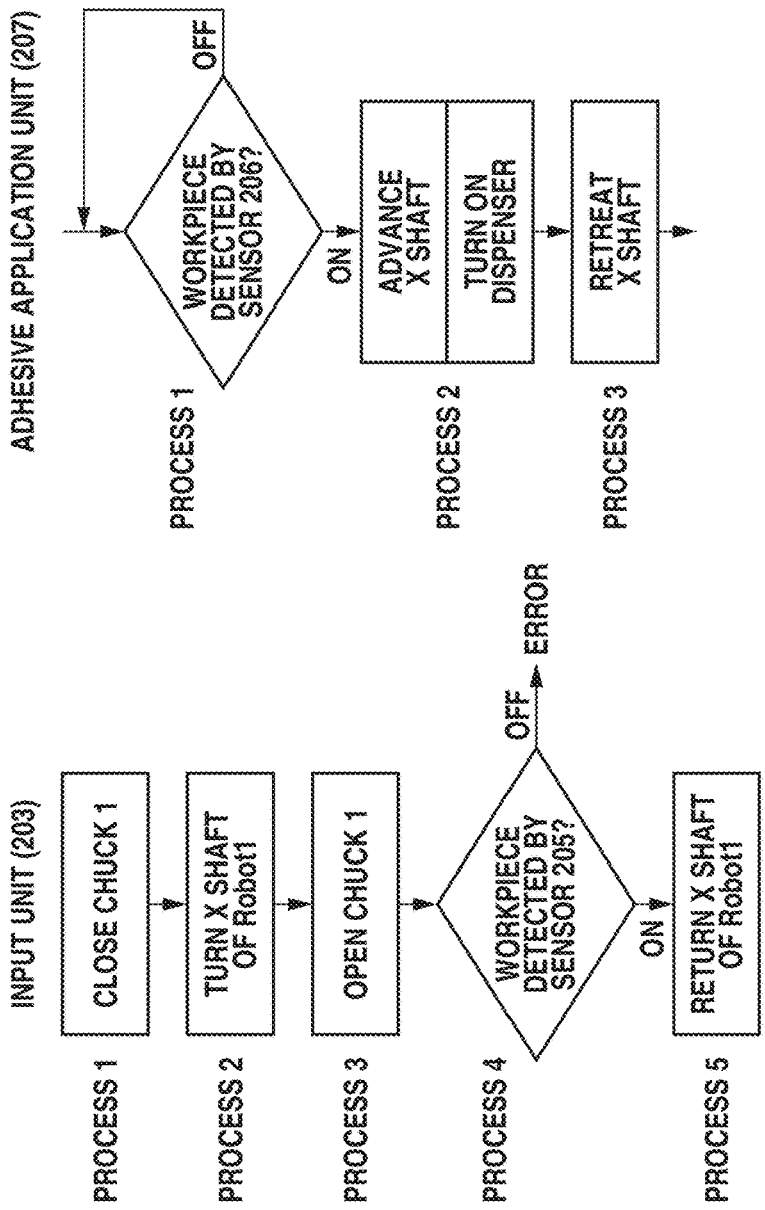

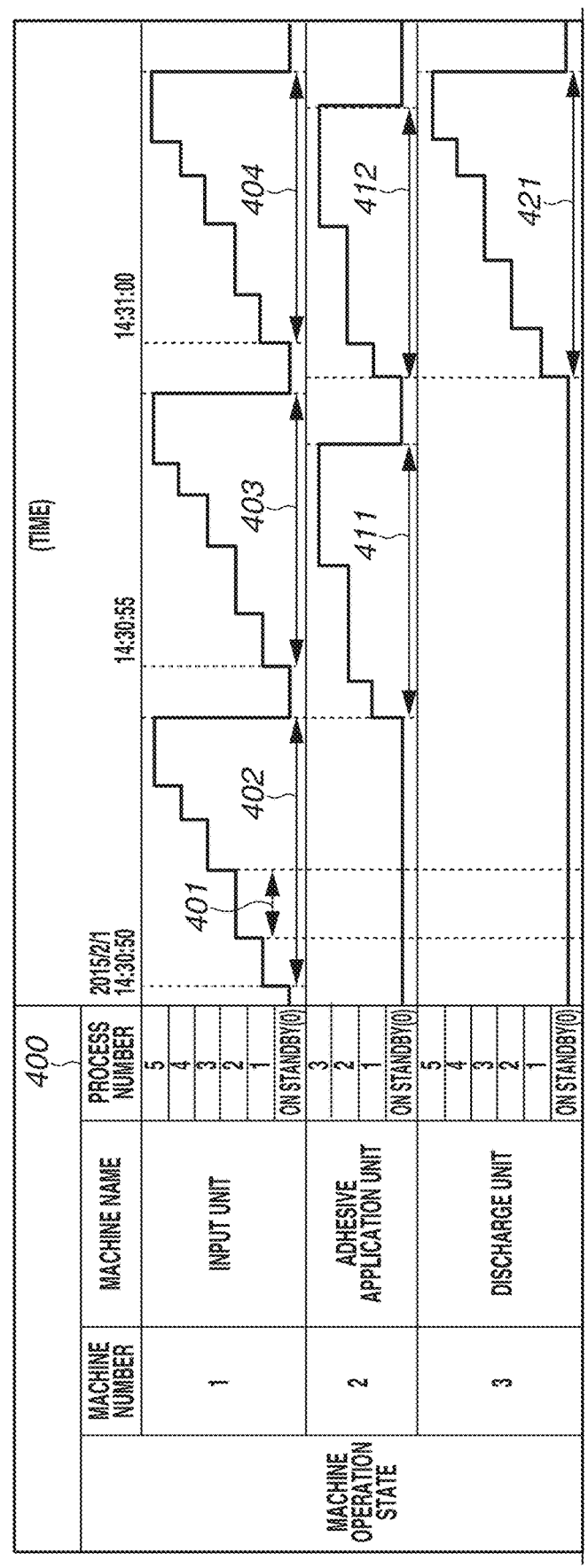

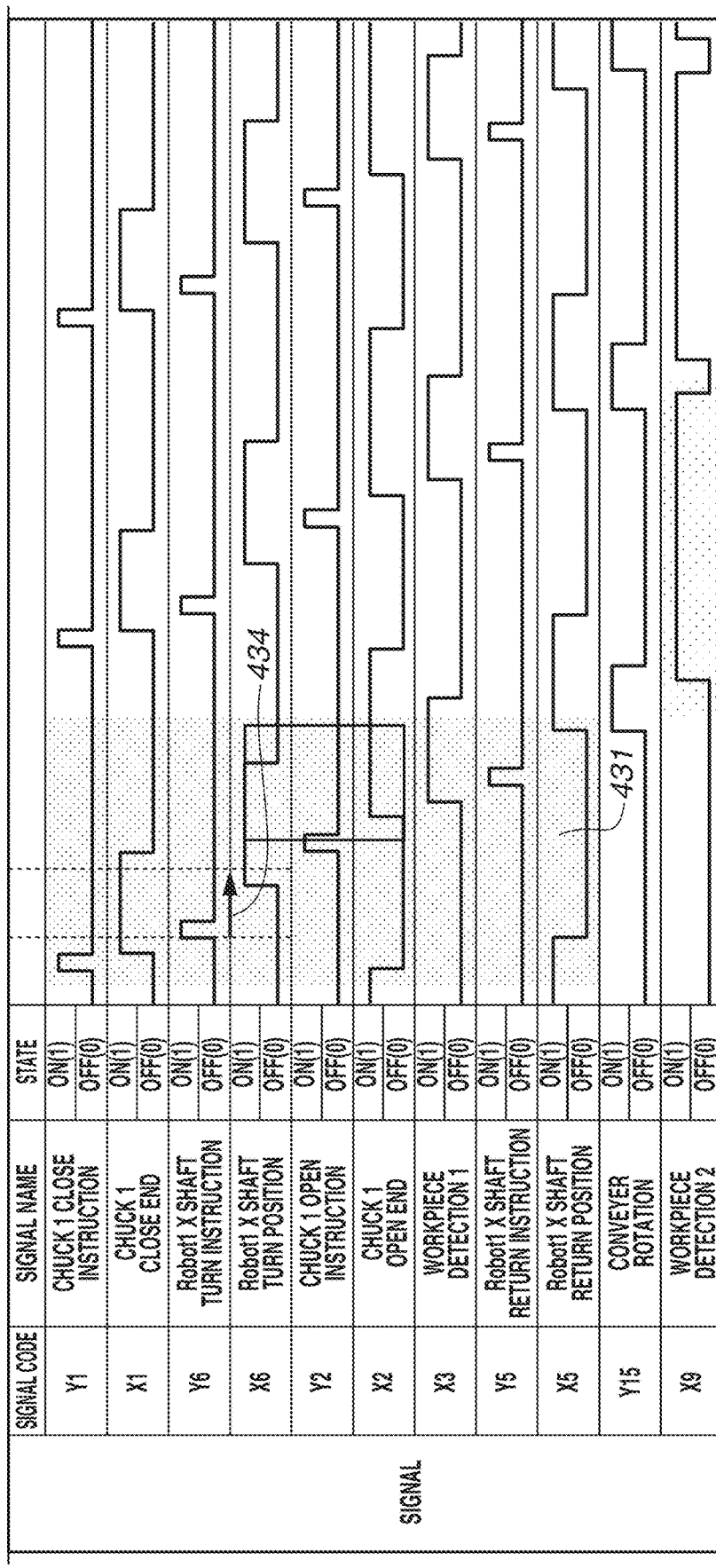

FIG.5

| MACHINE NUMBER | PROCESS NUMBER | MACHINE NAME | OPERATION STATE NUMBER | SIGNAL CODE | SIGNAL NAME |
|---|---|---|---|---|---|
| 1 | 1 | INPUT UNIT | 1 | Y1 | CHUCK 1 CLOSE INSTRUCTION |
| 1 | 1 | INPUT UNIT | 1 | X1 | CHUCK 1 CLOSE END |
| 1 | 2 | INPUT UNIT | 1 | Y6 | Robot1 X SHAFT TURN INSTRUCTION |
| 1 | 2 | INPUT UNIT | 1 | X6 | Robot1 X SHAFT TURN POSITION |
| 1 | 3 | INPUT UNIT | 1 | Y2 | CHUCK 1 OPEN INSTRUCTION |
| 1 | 3 | INPUT UNIT | 1 | X2 | CHUCK 1 OPEN END |
| 1 | 4 | INPUT UNIT | 1 | X3 | WORKPIECE DETECTION 1 |
| 1 | 5 | INPUT UNIT | 1 | Y5 | Robot1 X SHAFT RETURN INSTRUCTION |
| 1 | 6 | INPUT UNIT | 1 | X5 | Robot1 X SHAFT RETURN POSITION |
| 2 | 1 | ADHESIVE APPLICATION UNIT | 1 | X9 | WORKPIECE DETECTION 2 |
| 2 | 2 | ADHESIVE APPLICATION UNIT | 1 | Y7 | X SHAFT ADVANCE INSTRUCTION |
| 2 | 2 | ADHESIVE APPLICATION UNIT | 1 | X7 | AH1 X SHAFT ADVANCE POSITION |
| 2 | 2 | ADHESIVE APPLICATION UNIT | 1 | Y9 | DISPENSER |
| 2 | 3 | ADHESIVE APPLICATION UNIT | 1 | Y8 | X SHAFT RETREAT INSTRUCTION |
| 2 | 3 | ADHESIVE APPLICATION UNIT | 1 | X8 | AH1 X SHAFT RETREAT POSITION |
| 3 | 1 | DISCHARGE UNIT | 1 | X13 | WORKPIECE DETECTION 3 |
| 3 | 2 | DISCHARGE UNIT | 1 | Y10 | CHUCK 2 CLOSE INSTRUCTION |
| 3 | 2 | DISCHARGE UNIT | 1 | X10 | CHUCK 2 CLOSE END |
| 3 | 3 | DISCHARGE UNIT | 1 | Y13 | Robot2 X SHAFT TURN INSTRUCTION |
| 3 | 3 | DISCHARGE UNIT | 1 | X15 | Robot2 X SHAFT TURN POSITION |
| 3 | 4 | DISCHARGE UNIT | 1 | Y11 | CHUCK 2 OPEN INSTRUCTION |
| 3 | 4 | DISCHARGE UNIT | 1 | X11 | CHUCK 2 OPEN END |
| 3 | 5 | DISCHARGE UNIT | 1 | Y12 | Robot2 X SHAFT RETURN INSTRUCTION |
| 3 | 5 | DISCHARGE UNIT | 1 | X14 | Robot2 X SHAFT RETURN POSITION |

FIG.6

| MACHINE NUMBER | PROCESS NUMBER | MACHINE NAME | OPERATION STATE NUMBER | SIGNAL CODE | SIGNAL NAME | DETERMINATION CONDITION | DETERMINATION THRESHOLD | |
|---|---|---|---|---|---|---|---|---|
| | | | | | | | UPPER LIMIT VALUE | LOWER LIMIT VALUE |
| 1 | 1 | INPUT UNIT | 1 | Y1 | CHUCK 1 CLOSE INSTRUCTION | ON | 0.27 | 0.234 |
| 1 | 1 | INPUT UNIT | 1 | Y1 | CHUCK 1 CLOSE INSTRUCTION | OFF | 0.614 | 0.532 |
| 1 | 1 | INPUT UNIT | 1 | X1 | CHUCK 1 CLOSE END | ON | 0.758 | 0.622 |
| 1 | 1 | INPUT UNIT | 1 | X1 | CHUCK 1 CLOSE END | OFF | 0.196 | 0.107 |
| 1 | 2 | INPUT UNIT | 1 | Y6 | Robot1 X SHAFT TURN INSTRUCTION | ON | ... | ... |
| 1 | 2 | INPUT UNIT | 1 | Y6 | Robot1 X SHAFT TURN INSTRUCTION | OFF | ... | ... |
| 1 | 2 | INPUT UNIT | 1 | X6 | Robot1 X SHAFT TURN POSITION | ON | ... | ... |
| 1 | 2 | INPUT UNIT | 1 | X6 | Robot1 X SHAFT TURN POSITION | OFF | ... | ... |
| 1 | 3 | INPUT UNIT | 1 | Y2 | CHUCK 1 OPEN INSTRUCTION | ON | ... | ... |
| 1 | 3 | INPUT UNIT | 1 | Y2 | CHUCK 1 OPEN INSTRUCTION | OFF | ... | ... |
| 1 | 3 | INPUT UNIT | 1 | X2 | CHUCK 1 OPEN END | ON | ... | ... |
| 1 | 3 | INPUT UNIT | 1 | X2 | CHUCK 1 OPEN END | OFF | ... | ... |
| 1 | 4 | INPUT UNIT | 1 | X3 | WORKPIECE DETECTION 1 | ON | ... | ... |
| 1 | 4 | INPUT UNIT | 1 | X3 | WORKPIECE DETECTION 1 | OFF | ... | ... |
| 1 | 5 | INPUT UNIT | 1 | Y5 | Robot1 X SHAFT RETURN INSTRUCTION | ON | ... | ... |
| 1 | 5 | INPUT UNIT | 1 | Y5 | Robot1 X SHAFT RETURN INSTRUCTION | OFF | ... | ... |
| 1 | 5 | INPUT UNIT | 1 | X5 | Robot1 X SHAFT RETURN POSITION | ON | ... | ... |
| 1 | 5 | INPUT UNIT | 1 | X5 | Robot1 X SHAFT RETURN POSITION | OFF | ... | ... |
| 2 | 1 | ADHESIVE APPLICATION UNIT | 1 | X9 | WORKPIECE DETECTION 2 | ON | ... | ... |
| 2 | 1 | ADHESIVE APPLICATION UNIT | 1 | X9 | WORKPIECE DETECTION 2 | OFF | ... | ... |
| 2 | 2 | ADHESIVE APPLICATION UNIT | 1 | Y7 | X SHAFT ADVANCE INSTRUCTION | ON | ... | ... |
| 2 | 2 | ADHESIVE APPLICATION UNIT | 1 | Y7 | X SHAFT ADVANCE INSTRUCTION | OFF | ... | ... |
| 2 | 2 | ADHESIVE APPLICATION UNIT | 1 | X7 | AH1 X SHAFT ADVANCE POSITION | ON | ... | ... |
| 2 | 2 | ADHESIVE APPLICATION UNIT | 1 | X7 | AH1 X SHAFT ADVANCE POSITION | OFF | ... | ... |
| 2 | 2 | ADHESIVE APPLICATION UNIT | 1 | Y9 | DISPENSER | ON | ... | ... |
| 2 | 2 | ADHESIVE APPLICATION UNIT | 1 | Y9 | DISPENSER | OFF | ... | ... |
| 2 | 3 | ADHESIVE APPLICATION UNIT | 1 | Y8 | X SHAFT RETREAT INSTRUCTION | ON | ... | ... |
| 2 | 3 | ADHESIVE APPLICATION UNIT | 1 | Y8 | X SHAFT RETREAT INSTRUCTION | OFF | ... | ... |
| 2 | 3 | ADHESIVE APPLICATION UNIT | 1 | X8 | AH1 X SHAFT RETREAT POSITION | ON | ... | ... |
| 2 | 3 | ADHESIVE APPLICATION UNIT | 1 | X8 | AH1 X SHAFT RETREAT POSITION | OFF | ... | ... |
| 3 | 1 | DISCHARGE UNIT | 1 | X13 | WORKPIECE DETECTION 3 | ON | ... | ... |
| 3 | 1 | DISCHARGE UNIT | 1 | X13 | WORKPIECE DETECTION 3 | OFF | ... | ... |
| 3 | 2 | DISCHARGE UNIT | 1 | Y10 | CHUCK 2 CLOSE INSTRUCTION | ON | ... | ... |
| 3 | 2 | DISCHARGE UNIT | 1 | Y10 | CHUCK 2 CLOSE INSTRUCTION | OFF | ... | ... |
| 3 | 2 | DISCHARGE UNIT | 1 | X10 | CHUCK 2 CLOSE END | ON | ... | ... |
| 3 | 2 | DISCHARGE UNIT | 1 | X10 | CHUCK 2 CLOSE END | OFF | ... | ... |
| 3 | 3 | DISCHARGE UNIT | 1 | Y13 | Robot2 X SHAFT TURN INSTRUCTION | ON | ... | ... |
| 3 | 3 | DISCHARGE UNIT | 1 | Y13 | Robot2 X SHAFT TURN INSTRUCTION | OFF | ... | ... |
| 3 | 3 | DISCHARGE UNIT | 1 | X15 | Robot2 X SHAFT TURN POSITION | ON | ... | ... |
| 3 | 3 | DISCHARGE UNIT | 1 | X15 | Robot2 X SHAFT TURN POSITION | OFF | ... | ... |
| 3 | 4 | DISCHARGE UNIT | 1 | Y11 | CHUCK 2 OPEN INSTRUCTION | ON | ... | ... |
| 3 | 4 | DISCHARGE UNIT | 1 | Y11 | CHUCK 2 OPEN INSTRUCTION | OFF | ... | ... |
| 3 | 4 | DISCHARGE UNIT | 1 | X11 | CHUCK 2 OPEN END | ON | ... | ... |
| 3 | 4 | DISCHARGE UNIT | 1 | X11 | CHUCK 2 OPEN END | OFF | ... | ... |
| 3 | 5 | DISCHARGE UNIT | 1 | Y12 | Robot2 X SHAFT RETURN INSTRUCTION | ON | ... | ... |
| 3 | 5 | DISCHARGE UNIT | 1 | Y12 | Robot2 X SHAFT RETURN INSTRUCTION | OFF | ... | ... |
| 3 | 5 | DISCHARGE UNIT | 1 | X14 | Robot2 X SHAFT RETURN POSITION | ON | ... | ... |
| 3 | 5 | DISCHARGE UNIT | 1 | X14 | Robot2 X SHAFT RETURN POSITION | OFF | ... | ... |

FIG.7

| MACHINE NUMBER | PROCESS NUMBER | MACHINE NAME | DETERMINATION THRESHOLD ||
|---|---|---|---|---|
| | | | UPPER LIMIT VALUE | LOWER LIMIT VALUE |
| 1 | 1 | INPUT UNIT | 0.35 | 0.22 |
| 1 | 2 | INPUT UNIT | 0.28 | 0.21 |
| 1 | 3 | INPUT UNIT | ... | ... |
| 1 | 4 | INPUT UNIT | ... | ... |
| 1 | 5 | INPUT UNIT | ... | ... |
| 2 | 1 | ADHESIVE APPLICATION UNIT | ... | ... |
| 2 | 2 | ADHESIVE APPLICATION UNIT | ... | ... |
| 2 | 3 | ADHESIVE APPLICATION UNIT | ... | ... |
| 3 | 1 | DISCHARGE UNIT | ... | ... |
| 3 | 2 | DISCHARGE UNIT | ... | ... |
| 3 | 3 | DISCHARGE UNIT | ... | ... |
| 3 | 4 | DISCHARGE UNIT | ... | ... |
| 3 | 5 | DISCHARGE UNIT | ... | ... |

FIG.9

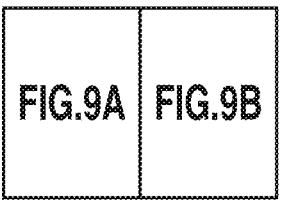

FIG.9A

| MACHINE NUMBER | PROCESS NUMBER | MACHINE NAME | OPERATION STATE NUMBER | SIGNAL CODE | SIGNAL NAME |
|---|---|---|---|---|---|
| 1 | 1 | INPUT UNIT | 1 | Y1 | CHUCK 1 CLOSE INSTRUCTION |
| 1 | 1 | INPUT UNIT | 1 | X1 | CHUCK 1 CLOSE END |
| 1 | 2 | INPUT UNIT | 1 | Y6 | Robot1 X SHAFT TURN INSTRUCTION |
| 1 | 2 | INPUT UNIT | 1 | X6 | Robot1 X SHAFT TURN POSITION |
| 1 | 3 | INPUT UNIT | 1 | Y2 | CHUCK 1 OPEN INSTRUCTION |
| 1 | 3 | INPUT UNIT | 1 | X2 | CHUCK 1 OPEN END |
| 1 | 4 | INPUT UNIT | 1 | X3 | WORKPIECE DETECTION 1 |
| 1 | 5 | INPUT UNIT | 1 | Y5 | Robot1 X SHAFT RETURN INSTRUCTION |
| 1 | 6 | INPUT UNIT | 1 | X5 | Robot1 X SHAFT RETURN POSITION |
| 2 | 1 | ADHESIVE APPLICATION UNIT | 1 | X9 | WORKPIECE DETECTION 2 |
| 2 | 2 | ADHESIVE APPLICATION UNIT | 1 | Y7 | X SHAFT ADVANCE INSTRUCTION |
| 2 | 2 | ADHESIVE APPLICATION UNIT | 1 | X7 | AH1 X SHAFT ADVANCE POSITION |
| 2 | 2 | ADHESIVE APPLICATION UNIT | 1 | Y9 | DISPENSER |
| 2 | 3 | ADHESIVE APPLICATION UNIT | 1 | Y8 | X SHAFT RETREAT INSTRUCTION |
| 2 | 3 | ADHESIVE APPLICATION UNIT | 1 | X8 | AH1 X SHAFT RETREAT POSITION |
| 3 | 1 | DISCHARGE UNIT | 1 | X13 | WORKPIECE DETECTION 3 |
| 3 | 2 | DISCHARGE UNIT | 1 | Y10 | CHUCK 2 CLOSE INSTRUCTION |
| 3 | 2 | DISCHARGE UNIT | 1 | X10 | CHUCK 2 CLOSE END |
| 3 | 3 | DISCHARGE UNIT | 1 | Y13 | Robot2 X SHAFT TURN INSTRUCTION |
| 3 | 3 | DISCHARGE UNIT | 1 | X15 | Robot2 X SHAFT TURN POSITION |
| 3 | 4 | DISCHARGE UNIT | 1 | Y11 | CHUCK 2 OPEN INSTRUCTION |
| 3 | 4 | DISCHARGE UNIT | 1 | X11 | CHUCK 2 OPEN END |
| 3 | 5 | DISCHARGE UNIT | 1 | Y12 | Robot2 X SHAFT RETURN INSTRUCTION |
| 3 | 5 | DISCHARGE UNIT | 1 | X14 | Robot2 X SHAFT RETURN POSITION |

FIG.9B

| FIRST CYCLE | | SECOND CYCLE | | ... | N-TH CYCLE | | ON TIMING | | OFF TIMING | | ON TIMING DETERMINATION THRESHOLD | | OFF TIMING DETERMINATION THRESHOLD | |
|---|---|---|---|---|---|---|---|---|---|---|---|---|---|---|
| ON | OFF | ON | OFF | | ON | OFF | AVERAGE | DEVIATION | AVERAGE | DEVIATION | UPPER LIMIT VALUE | LOWER LIMIT VALUE | UPPER LIMIT VALUE | LOWER LIMIT VALUE |
| 0.251 | 0.564 | 0.253 | 0.574 | | 0.248 | 0.583 | 0.252 | 0.003 | 0.578 | 0.006 | 0.270 | 0.234 | 0.614 | 0.542 |

INFORMATION PROCESSING APPARATUS, METHOD OF CONTROLLING INFORMATION PROCESSING APPARATUS, PRODUCTION SYSTEM, METHOD OF MANUFACTURING ARTICLE, AND RECORDING MEDIUM

BACKGROUND

Field of the Disclosure

The present disclosure relates to an information processing apparatus.

Description of the Related Art

In a production line including a plurality of machine facilities controlled by a control apparatus, such as a sequence controller, it is desirable to grasp the operation state of the machine facilities rapidly and suitably to maintain the machine facilities. Thus, the function of detecting an operation diverging from a normal operation state by monitoring the operation state of the machine facilities, and notifying a user of the resultant has been proposed. For example, Japanese Patent Application No. 2008-97096 discusses a monitoring system that records on/off states of signals of a sensor, an actuator, and the like installed on a machine facility while causing the machine facility to operate a predetermined number of times, and monitors an operation state of the machine facility based on the on/off state of each of the signals.

To monitor the operation state of the machine facility by using a time period from a timing when the machine facility starts operation to when the signal of each of the devices is turned on or off as discussed in Japanese Patent Application No. 2008-97096, it is necessary to teach an operation start timing of the machine facility as a measurement reference for each of the signals, to the monitoring system. Further, in typical techniques, control signals are simply displayed in list form on a screen displaying the operation state of the machine facility. Thus, it is necessary to check each component of the machine facility one by one for abnormality in order to locate an abnormal point. Accordingly, it takes an extremely long time to specify when and where the abnormality occurred in the machine facility.

SUMMARY

Embodiments of the present disclosure are directed to an information processing apparatus that enables an operation state of a mechanical facility to be easily grasped.

According to embodiments of the present invention, there is provided an information processing apparatus for displaying a state of a machine facility including a plurality of devices, on a display unit. An operation time for an operation of one predetermined device among the plurality of devices and signals relating to the operation are displayed on the display unit.

Further features of the present disclosure will become apparent from the following description of exemplary embodiments with reference to the attached drawings.

BRIEF DESCRIPTION OF THE DRAWINGS

FIGS. 3A to 3C are operation flowcharts of respective units according to the exemplary embodiment.

FIG. 5 is a table illustrating a used signal list according to the exemplary embodiment.

FIG. 6 is a table illustrating a determination condition list for the control signals according to the exemplary embodiment.

FIG. 7 is a table illustrating a determination condition list for processes according to the exemplary embodiment.

FIG. 9, composed of FIGS. 9A and 9B, is a diagram illustrating an average of measurement results and a standard deviation of control signals at on/off timings of the control signals of each unit, and determination thresholds at the on/off timings, according to the exemplary embodiment.

DESCRIPTION OF THE EMBODIMENTS

An exemplary embodiment of the present disclosure is described below with reference to accompanying drawings. The exemplary embodiment described below is merely illustrative, and for example, details of a configuration are appropriately changeable by a person skilled in the art without departing from the spirit of the present disclosure. Further, numerical values described in the present exemplary embodiment are reference numerical values and are not intended to limit the present disclosure.

Figure 1:
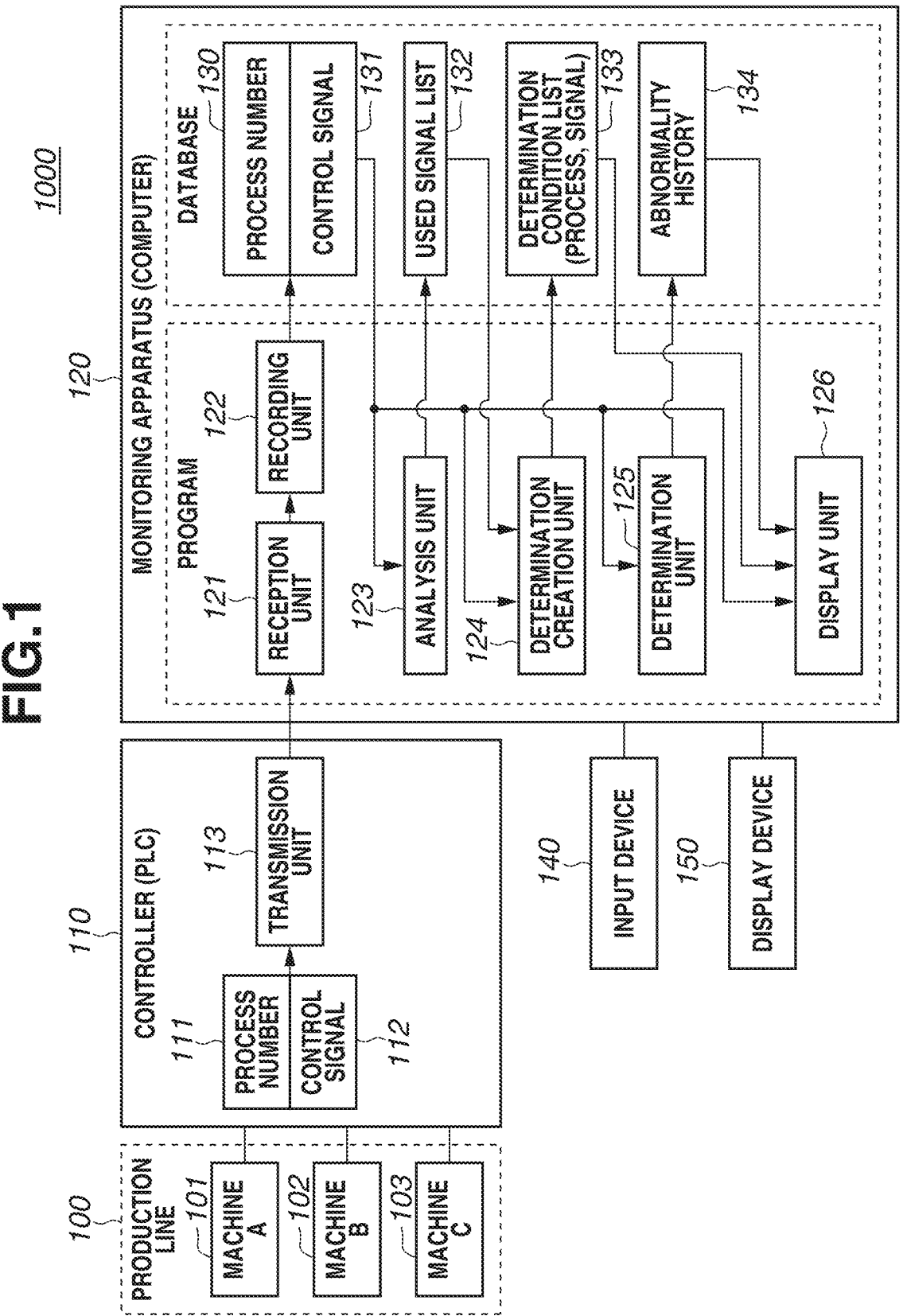
FIG. 1 is a control block diagram of a production system according to an exemplary embodiment.

A first exemplary embodiment of the present disclosure will be described below. FIG. 1 is a control block diagram illustrating a production system 1000 including a production line 100 and a monitoring apparatus 120 according to the present exemplary embodiment. The production line 100 includes a plurality of machines 101 to 103 that are operable independently of one another. Each of the machines 101 to 103 includes a plurality of sensors, a pneumatic apparatus, and a robot. The machines 101 to 103 are sequentially controlled by one programmable logic controller (PLC) 110.

The monitoring apparatus 120 includes a programmed general-purpose computer, and includes a central processing unit (CPU), a random access memory (RAM), and a read only memory (ROM). The monitoring apparatus 120 further includes a nonvolatile storage device having a large capacity, such as a memory and a magnetic disk device. The monitoring apparatus 120 further includes a display device 150, such as a display, and an input device 140, such as a mouse and a keyboard. A program section of the monitoring apparatus 120 is mainly configured by the CPU serving as a control unit, and functions of control blocks included in the program section are executed by the CPU. As a result, the monitoring apparatus 120 functions as an information processing apparatus.

Next, information transfer from the PLC 110 to the monitoring apparatus 120 in FIG. 1 will be described. The monitoring apparatus 120 includes the program section and a database section. Programs in the program section are branched into programs that monitor the machines and programs create conditions to monitor the machines. Information such as process numbers 111 and control signals 112 stored in a transfer area memory inside the PLC 110 is transferred from a transmission unit 113 of the PLC 110 to a reception unit 121 of the monitoring apparatus 120. The information as the process numbers 111 and the control signals 112 represents history of the control performed by the PLC 110.

The process number 111 indicates a number to identify a minimum operation unit of each of the units, treating each of the machines 101 to 103 as one unit. For example, an opening operation of a chuck of a robot arm of the machine 101 is defined by a numerical value with the PLC 110, such as a process number (1).

The control signals 112 indicate signals output from the PLC 110 to control the machines 101 to 103. For example, the control signals 112 are used to notify the PLC 110 that a sensor installed on the respective machines 101 to 103 has detected a workpiece, and are used for the PLC 110 to instruct the machines 101 to 103 to start an operations. The state of each of the control signals 112 is represented by on (1) or off (0). A recording unit 122 of the monitoring apparatus 120 structures the process numbers 111 and the control signals 112 received by the reception unit 121 so as to facilitate subsequent retrieval, and record the resultant in the database. The definition of the process numbers 111 and the recording of the control signals 112 described above are performed based on a specification of the definition of the process numbers 111 and a specification of the recording of the control signals 112 described in, for example, a ladder program to be referenced by the PLC 110.

Next, an analysis unit 123 and a determination creation unit 124 that are the above-described programs for creating the conditions to monitor the machines will be described.

The analysis unit 123 automatically determines which signal is being used in each of the processes of the respective units included in the production line 100, from information about process numbers 130 and control signals 131 in the database of the monitoring apparatus 120. Further, the analysis unit 123 records a result of the determination as a used signal list 132 (FIG. 5) in the database.

The determination creation unit 124 measures a variation in operation time of each of the processes in the respective units, and determines a threshold used for determining whether the machine operates normally or abnormally from, for example, a maximum value and a minimum value thereof. After determining the threshold for the normality/abnormality determination condition for all of the processes, the determination creation unit 124 stores results of the determination as a determination condition list 133 in the database.

Next, a determination unit 125 and a display unit 126 that are the above-described programs that monitors the machines will be described.

When the determination condition list 133 is created, processing of the determination unit 125 is automatically started. More specifically, when the process number 130 and/or the control signal 131 are(is) newly recorded in the monitoring apparatus 120, the determination unit 125 determines normality/abnormality of each of the control signals of the respective processes based on the determination condition list 133. In a case where an abnormal signal, which falls out of a range of the threshold for the determination condition, has been detected, an abnormality occurrence time and the symbol of the signal for which the abnormality has been detected are recorded as an abnormality history 134 in the database.

The display unit 126 has the function of notifying a worker of the occurrence of abnormality and/or displaying the occurrence of abnormality. When the abnormality history 134 is updated, the display unit 126 edits the abnormality history 134, the process numbers 130, the control signals 131, and the determination condition list 133 into a chart with high visibility (described below), and displays the chart on the display device 150.

Figure 2:
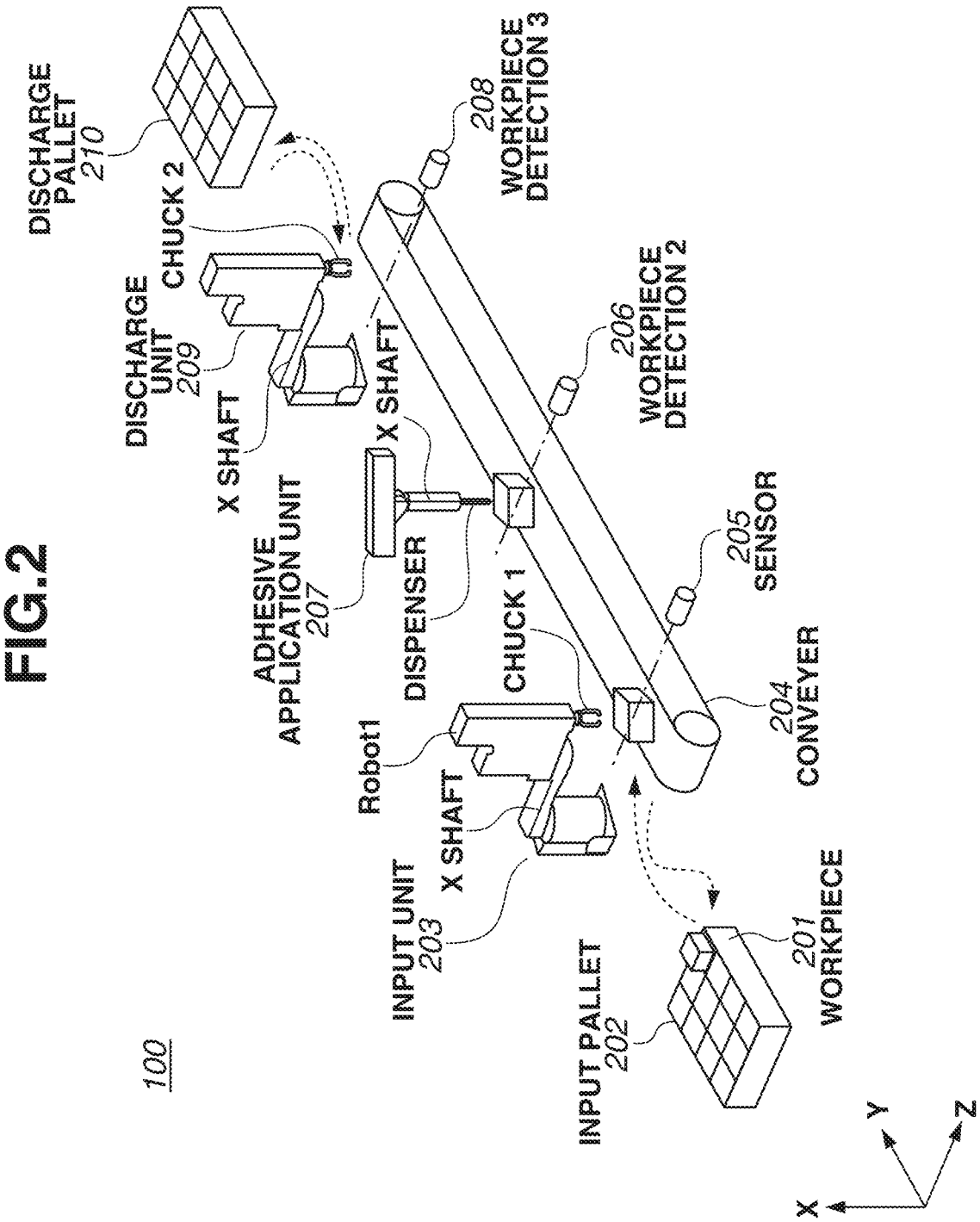
FIG. 2 is a schematic diagram of the production line according to the exemplary embodiment.

FIG. 2 is a diagram schematically illustrating the units in the production line 100 according to the present exemplary embodiment. FIGS. 3A to 3C are each a flowchart illustrating a minimum operation (process) in the respective units. The production line 100 in FIG. 2 includes an input unit 203, a conveyer 204, an adhesive application unit 207, and a discharge unit 209, and these machine units are controlled by one controller (PLC). These units each perform a predetermined work on a workpiece 201, thus manufacturing an article. The input unit 203, the adhesive application unit 207, and the discharge unit 209 in FIG. 2 respectively correspond to the machine A (101), the machine B (102), and the machine C (103) in FIG. 1.

Next, operations performed by each unit will be described with reference to FIG. 2 and FIGS. 3A to 3C. FIG. 3A illustrates a procedure of an operation of the input unit 203, FIG. 3B illustrates a procedure of an operation of the adhesive application unit 207, and FIG. 3C illustrates a procedure of an operation of the discharge unit 209. A description of the control of the conveyer 204 in conjunction with a flowchart is omitted in order to simplify the description.

Referring to FIG. 3A, when an input pallet 202 is set, the input unit 203 picks up the workpiece 201 on the input pallet 202 and carries the workpiece 201 onto the conveyer 204. In process 1 of FIG. 3A, a chuck 1 of the input unit 203 is closed to hold the workpiece 201 on the input pallet 202. Thereafter, in process 2, an X shaft of a Robot 1 of the input unit 203 is turned. In process 3, the chuck 1 is opened to place the workpiece 201 on the conveyer 204.

After the workpiece 201 is placed on the conveyer 204, it is determined in process 4 whether a sensor 205 has detected the workpiece 201. If the workpiece 201 has been detected by the sensor 205, the operation of the process 4 becomes an ON state. In a process 5, in order to pick up the workpiece 201 again, control is performed so that the X shaft of Robot1 is turned and the chuck 1 is moved above the input pallet 202. At this time, the conveyer 204 is operated until the workpiece 201 is detected by a sensor 206. If the workpiece 201 is not detected by the sensor 205 and an off state of the operation of the process 4 is continued for a predetermined time, an error is notified.

Next in FIG. 3B, if the workpiece 201 is detected by the sensor 206, the operation of a process 1 in FIG. 3B becomes ON state, and the adhesive application unit 207starts a work of applying an adhesive to the workpiece 201. The operation of process 1 in FIG. 3B is looped during the off state of the process 1 until the workpiece 201 is detected by the sensor 206.

If the operation of the process 1 is in the ON state, in a process 2, an X shaft for controlling a dispenser of the adhesive application unit 207 is moved forward, the dispenser is turned on, and a predetermined amount of adhesive is applied to the workpiece 201. Thereafter, in a process 3, the X shaft for controlling the dispenser is retreated.

At the same time when the operation of the adhesive application unit 207 is started in response to the operation of the process 1 in FIG. 3B shifting to the ON state, the input unit 203 performs the processes 1 to 3 in FIG. 3A to pick up a next workpiece 201 from the input pallet 202 and to place the workpiece 201 on the conveyer 204.

Next, in FIG. 3C, after application of the adhesive performed by the adhesive application unit 207 and the placement of the workpiece 201 by the input unit 203 are both completed, the conveyer 204 conveys the workpieces 201. At this time, the conveyer 204 is kept operating until the workpiece 201 processed by the adhesive application unit 207 is detected by a sensor 208.

If the sensor 208 detects the workpiece 201, the operation of a process 1 in FIG. 3C becomes the ON state, and the discharge unit 209 starts a work of storing the workpiece 201 in a discharge pallet 210. At the same time when the discharge unit 209 starts the operation, the input unit 203 and the adhesive application unit 207 start their respective works on the subsequent workpiece 201.

In FIG. 3C, if the sensor 208 detects the workpiece 201, the discharge unit 209 picks up the workpiece 201 on the conveyer 204, and carries the workpiece 201 onto the discharge pallet 210. In a process 2 in FIG. 3C, a chuck 2 of the discharge unit 209 is closed to hold the workpiece 201 on the conveyer 204. In a process 3, an X shaft of Robot2 of the discharge unit 209 is turned. In a process 4, the chuck 2 is opened to place the workpiece 201 on the discharge pallet 210. In a process 5, the X shaft of Robot2 is turned to move the chuck 2 above the conveyer 204 in order to pick up the workpiece 201 again. The operation of the process 1 in FIG. 3C is also to be looped in the off state unless the workpiece 201 is detected by the sensor 208.

The above-described operations are repeated until all of the workpieces 201 are emptied from the input pallet 202. Here, a period during which each unit is performing the corresponding work on a single workpiece 201 is referred to as a cycle. When the production line 100 starts operation in a state where no workpiece 201 is placed on the conveyer 204, only the input unit 203 operates in the first cycle, the input unit 203 and the adhesive application unit 207 operate in the second cycle, and all of the units operate in the third cycle. In and after the third cycle, the respective units operate until all of the workpieces 201 are emptied from the input pallet 202.

When all of the workpieces 201 are emptied from the input pallet 202, the input unit 203 shifts into a standby state. At the end of the next cycle, the adhesive application unit 207 shifts into the standby state. Then, at the end of the next cycle, all of the units shift into the standby state. In the standby state of the input unit 203, the chuck 1 is positioned above the conveyer 204. In the standby state of the adhesive application unit 207, the X shaft of is retreated. In the standby state of the discharge unit 209, the chuck 2 is positioned above the conveyer 204.

When an initial number of workpieces 201 on the input pallet 202 is N, each of the units performs the cycle operation for N times until all of the workpieces 201 are emptied from the input pallet 202 and each of the units stops operation.

Figure 4C:
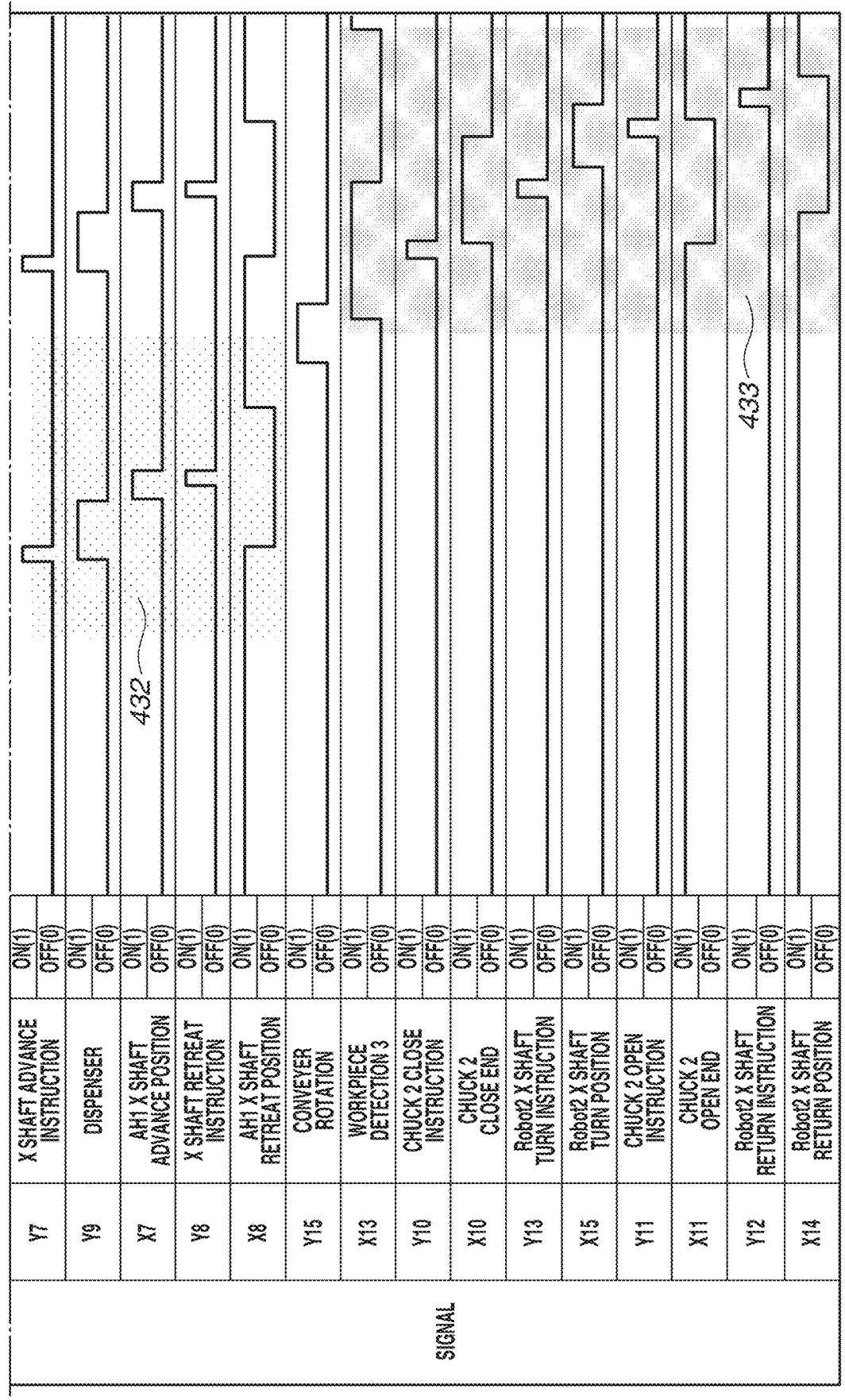
FIG. 4, composed of FIGS. 4A to 4C, is a diagram illustrating process numbers and control signals according to the exemplary embodiment.

Next, a method of determining the control signal used in each of the processes of the respective units to set the monitoring condition will be described. FIGS. 4A to 4C are each a time chart illustrating timings of control operations of the machines serving as the units of the production line 100 illustrated in FIG. 2 and FIGS. 3A to 3C. An upper part illustrates machine (unit) operation states, specifically, an operation state of the input unit 203 having a machine number 1, an operation state of the adhesive application unit 207 having a machine number 2, and an operation state of the discharge unit 209 having a machine number 3. Further, execution states of operation processes indicated by each process number 130 are illustrated in a timing chart in which the lateral axis represents time.

A lower part specifically illustrates various control signals 131 each corresponding to the corresponding one of the operation processes indicated by the respective process numbers 130 of the units having the machine numbers 1 to 3. In the lower part, signal symbols each of which represents the respective control signals 131, signal names representing a control operation of the respective control signals 131, and on/off state of the control signals 131 are illustrated in the timing chart, in which the lateral axis represents time.

Initially, the monitoring apparatus 120 is communicably connected to the PLC 110 which controls each unit of the production line 100, and brings the production line 100 into operation. The recording unit 122 of the monitoring apparatus 120 structures information about the control signals 112 and the process number 111 of each unit from the PLC 110 for 10 seconds, as one record of the database, and records the resultant as the process numbers 130 and the control signals 131 in the database.

The process numbers 130 each represent a process that is performed by the respective units at a certain time, among the processes illustrated in FIGS. 3A to 3C. The analysis unit 123 determines which control signals are used in the respective processes by using the characteristic that the works in the processes of the units illustrated in FIGS. 3A to 3C are performed in due order on the workpiece 201.

Next, a method of determining the control signals that is performed by the analysis unit 123 described above will be specifically described. In a case where the used signal list 132 in FIG. 5 has not been generated, the analysis unit 123 automatically starts processing. The analysis unit 123 initially reads out, from the database, the process numbers 130 and the control signals 131 in a period from when the workpiece 201 is input to the production line 100 in a state where the units are stopped due to the absence of workpiece 201 in the production line 100 and to when a finished product is discharged.

Examples of methods by which the analysis unit 123 acquires the above-described period include acquiring the period from operation data regarding the production line 100, which is accumulated in the past. A period from when the process numbers 130 of the respective units become all zero, that is, when the production line 100 becomes a state in which no unit performs the process, to a timing when any of the process numbers 130 of the units changes to a number other than zero, that is, when any of the units starts operation, is regarded as a period in which the workpiece 201 is input. Further, a period from the timing when any of the units starts operation to when a timing when the process numbers 130 of the respective units all become zero, that is, all of the units stop operation is regarded as a period in which the finished product is discharged.

FIGS. 4A to 4C illustrate the process numbers 130 and the control signals 131 in a period from when the respective units start operation in the state where no workpiece 201 is present in the respective units and the respective units stop operation to when the respective units complete the corresponding operation at least once (one cycle of each of flowcharts in FIGS. 3A to 3C).

In FIGS. 4A to 4C, signal symbols Y1, X1, Y6, X6, . . . represent symbols and addresses that are used by the PLC 110 to manage the control signals 131. A column 400 in FIGS. 4A to 4C represents the process numbers 130 of the respective units. The analysis unit 123 determines that each process is performed only during a period corresponding to the process number 130.

For example, in a case of a period 401 in the upper part of FIG. 4A, the analysis unit 123 determines that the process 2 of the input unit 203 is being performed. A period 402 in the upper part of FIG. 4A and an area 431 in the lower part of FIG. 4B each represent an operation for the first time performed by the input unit 203 having the machine number 1, a period 403 represents an operation for the second time performed by the input unit 203 having the machine number 1, and a period 404 represents an operation for the third time performed by the input unit 203 having the machine number 1. These indicate that the processes of a certain unit are performed in the periods 402 to 404 in a stepwise manner.

Similarly, a period 411 and an area 432 each represent an operation for the first time performed by the adhesive application unit 207 having the machine number 2, a period 412 represents an operation for the second time performed by the adhesive application unit 207 having the machine number 2, and a period 421 and an area 433 each represent an operation for the first time performed by the discharge unit 209 having the machine number 3.

The analysis unit 123 recognizes, based on these pieces of information, a signal that always changes between on and off while any of the processes of the same unit is being performed, as a signal that is being used by that unit. Further, the analysis unit 123 associates the processes with the corresponding one of the control signals based on the premise that one signal is always used by only one unit. In the above-described example, the period 402 corresponds to the area 431, the period 411 correspond to the area 432, and the period 421 corresponds to the area 433.

It is not easy to determine the signal that is being used in the respective processes from the on/off information about the control signals in a state where all of the units are operating, as in the periods 404, 412, and 421 in FIG. 4A. However, utilizing the characteristics that the units and the processes are operated in a stepwise manner makes it possible to associate the control signals with the processes of the units easily and accurately.

For example, during the period 401 in FIG. 4A, only the process 2 of the input unit 203 is being performed. In other words, the signal with change between on and off during the period (period 434) is the signal that is being used in the process 2 of the input unit 203, so that the analysis unit 123 can determine that the signals with the signal symbols Y6 and X6 are the signals that are being used.

Next, when the period 411 and in the area 432 are focused, the input unit 203 and the adhesive application unit 207 are concurrently operate in these period. However, considering a difference between the period 402, during which only the input unit 203 operates, and the period 411, the control signals used in the respective processes of the adhesive application unit 207 can be specified in a similar manner.

Similarly, a difference between the operation information for the period during which the input unit 203, the adhesive application unit 207, and the discharge unit 209 are concurrently operating, and the operation information for the period during which the input unit 203 and the adhesive application unit 207 are singularly operating is calculated. This makes it possible to determine only the control signals that is used in the respective processes in the period 421 and the area 433 for the discharge unit 209.

The above-described method is to specify the control signals used in the respective processes by using the characteristics that the units and the processes operate in a stepwise manner, from a state where no workpiece 201 is present in the respective units to a state where the respective units perform the corresponding work on the respective workpieces 201. On the other hand, during a period from when an operation of discharging the workpiece 201 is started in a state where the respective units perform the corresponding work on the respective workpieces 201 to when all of the workpieces 201 are discharged, the number of processes being performed decreases also in a stepwise manner. Thus, also in the period after this, the control signals that are used in the respective processes can be specified in a similar manner.

Accordingly, a worker may specify a period from when the input of the workpiece 201 is stopped in a state where the workpiece 201 is present in every machine (unit) of the production line 100 to when the workpieces 201 processed by the units are all discharged, and may create the used signal list 132 by using the process numbers 130 and the control signals 131 of the period.

Further, depending on the production line, a plurality of units may concurrently perform works on one workpiece. Example of such a case include a case in which two adhesive application units 207 in FIG. 2 are provided and these two adhesive application units 207 concurrently apply adhesives to a single workpiece 201.

In such a case, while it is possible to specify that a certain signal is used by a first or second adhesive application unit 207 with the use of the above-described method of specifying the signals is used, it is not possible to specify which unit uses the certain signal.

In such a case, the process using the certain signal is specified by using a slight deviation of the on/off timing of the signal, which occurs in each unit. As for the deviation in on/off timing of the control signals, the on/off timing slightly varies between even the same control signals due to various factors such as a reaction speed of each of the sensors, a transmission time of the control signal, and sliding resistance of the unit.

Actually, deviations in timing when the control signal that is used in the process of the unit is turned on and in timing when the process ends tend to be smaller than deviations in timing when the process of the unit that does not use the control signal is started and in timing when the process ends. For example, assume that a unit A and a unit B that concurrently perform work on a workpiece are provided, and a control signal a is used in a process 1 of the unit A.

In this case, deviations in a timing when the signal a is turned on and in a timing when the process 1 ends are smaller than deviations in a timing when a process 1 of the unit B starts and in a timing when the process 1 ends.

As described above, in the case where the plurality of units performs the works on a single workpiece, the process that possibly uses a control signal to be specified is narrowed down by the above-described method. Further, "a time period from a timing when a certain signal is turned on to when the process ends" as illustrated in the period 434 in FIG. 4B is measured for a plurality of cycles, and it is determined that the process in which a difference between the maximum value of the time and the minimum value of the time becomes the smallest uses the signal. As a result, even in the case where the plurality of units concurrently operates, it is possible to specify the control signals being used in the respective process units.

FIG. 5 is a table illustrating the respective units, the respective processes, and the respective control signals used in the respective processes which are determined by the above-described methods, in association with each other. The table illustrated in FIG. 5 is recorded as the used signal list 132 in the database.

Next, a method of creating monitoring conditions of the machines (units) will be described. In a case where the used signal list 132 in FIG. 5 has been created but the determination condition list 133 has not been created, the determination creation unit 124 automatically starts processing.

The determination creation unit 124 creates the determination condition list 133 illustrated in FIG. 6 and FIG. 7 by referring the used signal list 132 illustrated in FIG. 5. The determination condition list 133 is used for determining normality or abnormality of each of the processes and each of the control signals. The used signal list 132 is created by the analysis unit 123 and is stored in the database. FIG. 6 illustrates a determination condition list for the control signals 131, and FIG. 7 illustrates a determination condition list for the processes corresponding to the process numbers 130. In the following, derivation processes of the determination condition lists will be described.

In this example, a plurality of determination conditions is settable to one signal symbol in the used signal list 132. Further, the method of determining normality/abnormality of each of the control signals is previously determined, and, in the present exemplary embodiment, normality and abnormality are determined by using the on/off timing of each of the control signals. The on/off timing is defined as time when, after each of the processes of the respective units starts operation, the control signal used in the process is turned on or off.

Figure 8:
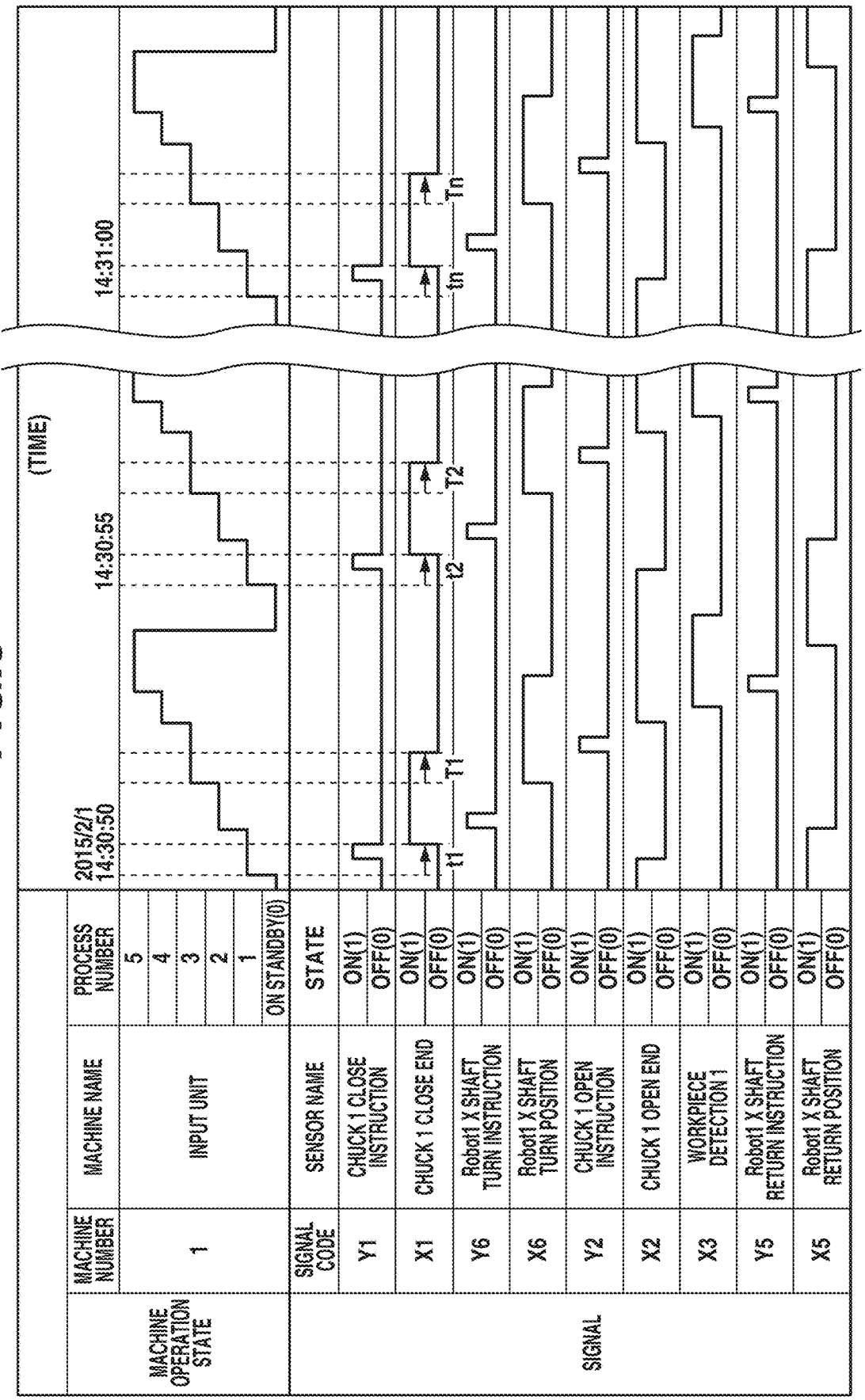
FIG. 8 is a diagram illustrating states of the control signals in processes of an input unit according to the exemplary embodiment.

FIG. 8 illustrates states of the control signals in the processes 1 to 5 of the input unit 203, which are recorded a plurality of times (n times, where n=1 to N), where t1, t2, and tn each represent an on timing of a control signal X1, and T1, T2, and Tn each represent an off timing of the control signal X1. Further, a natural number immediately following t or T represents the n-th recording of the on/off timing of the control signal X1.

As described above, each of the sensors has a slight difference in on/off timing due to various factors, such as the reaction speed, the transmission time of the control signal, and the sliding resistance of the machine. Thus, the on/off timings of the respective control signals for a plurality of cycles are measured by using this characteristic, and a range from the minimum value to the maximum value is defined as "a range in which a variation in on/off timing in the normal state is allowed".

Next, the procedure of measuring the on/off timings of the respective control signals in the corresponding process, for the plurality of cycles, will be described.

First, the process numbers 130 and the signal symbols of the respective control signals 131 of each of the units are acquired from the used signal list 132 stored in the database. Thereafter, the on/off timings of the control signals used in each process in the respective units are measured n times (n=1 to N) based on the acquired information.

FIGS. 9A and 9B illustrate an average of measurement results and a standard deviation of control signals for n times (n=1 to N) at on/off timings of the control signals of each unit, and determination thresholds at the on/off timings. An upper limit value and a lower limit value that are the determination thresholds used for normality/abnormality determination are calculated from statistics of the measurement results. The calculation may be performed by using, for example, a value obtained by multiplying the average value±6 by the standard deviation, or using a maximum value and a minimum value.

The determination thresholds are calculated for each of the control signals illustrated in the used signal list 132, to generate the determination condition list for the control signals 131 illustrated in FIG. 6. In addition, the execution time of each of the processes of the respective units is calculated from the process number 130, and an upper limit value and a lower limit value for the determination threshold are calculated from statistical values (e.g., average and deviation) of the measurement results for n times (n=1 to N) in a manner similar to the calculation of the determination thresholds for the control signals. Thereafter, the determination condition list for the processes corresponding to the process numbers 130 illustrated in FIG. 7 is generated. The determination condition lists illustrated in FIG. 6 and FIG. 7 are collectively stored as the determination condition list 133 in the database.

Next, a method of monitoring each of the units and each of the processes will be described. When the determination condition list 133 illustrated in FIG. 6 and FIG. 7 is stored in the database, the monitoring apparatus 120 starts to monitor the process numbers 130 and the control signals 131 transmitted from the PLC 110.

Thereafter, the determination unit 125 performs normality/abnormality determination of each of the processes and each of the control signals, based on the determination condition list 133. In the present exemplary embodiment, the normality/abnormality determination for each of the processes is made at the timing when each of the processes is turned off (timing when each of processes ends), and the normality/abnormality determination for each of the control signals is made at the timing when each of the control signals is turned on.

This is because each of the control signals does not influence on the corresponding process itself even in the on state, so that the off timing of each of the control signals is not suitable for the determination. Further, since each of the processes is turned on when the corresponding signal is turned on, so that the start timing of the process can be grasped only by checking if the corresponding control signal is in the on state. Furthermore, if the on timing is abnormal, the off timing inevitably becomes also abnormal. Thus, using the determination as to whether the timing when the process is turned off is accurate is more suitable for the normality/abnormality determination for each of the processes.

In a case where one or both of the off timing of the process and the on timing of the corresponding control signal are out of the determination thresholds in the determination condition list 133, time when one or both of the off timing of the process and the on timing of the control signal fall out of the determination thresholds, the machine number, the process number, the signal symbol, and the signal name are recorded in the abnormality history 134.

Figure 10:
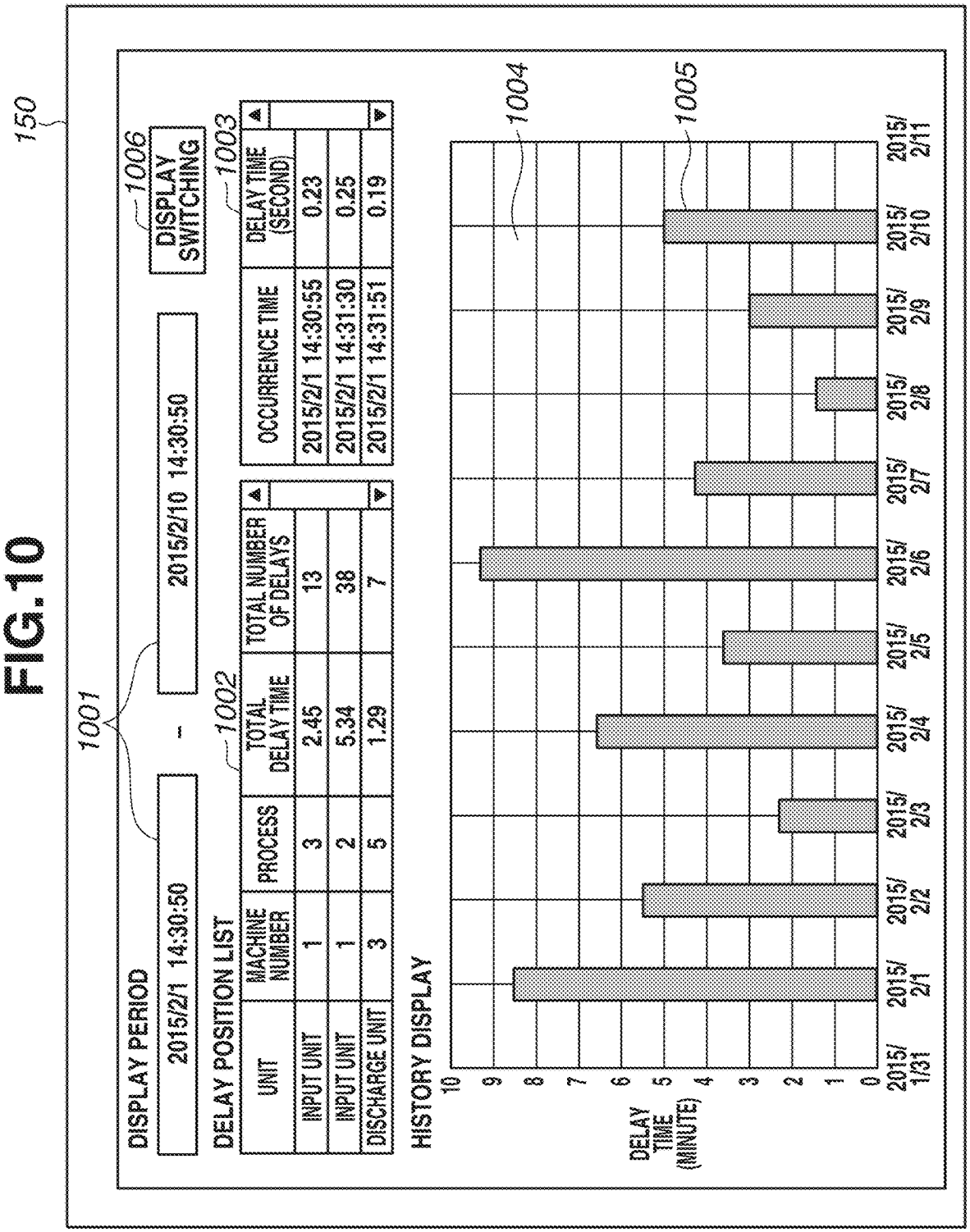
FIG. 10 is a diagram illustrating an example of a screen displayed on a display device by a display unit according to the exemplary embodiment.

FIG. 10 illustrates an example of a screen displayed on the display device 150 by the display unit 126. In the present exemplary embodiment, the display used by a personal computer (PC) is described as an example of the display device 150; however, the display device 150 may be a touch panel. In a case where the abnormality history 134 is updated, the display unit 126 displays an update result on the display device 150. In a case where abnormality occurs, the display unit 126 notifies the worker of the occurrence of the abnormality.

Blocks 1001 in FIG. 10 illustrate a history period in the abnormality history 134. In the present exemplary embodiment, the abnormality history for the past 10 days from a last update date of the abnormality history 134 is first displayed. The worker can change the display period by operating the block 1001.

Table 1002 in FIG. 10 illustrates a total delay time period and a total number of delays for each process of the respective units. Table 1003 is displayed when a cell in the column of the total delay time period in the table 1002 is selected, and illustrates delay occurrence times and delay time periods of a selected item. For example, when a cell having the total delay time period of 2.45 is selected, a display pattern such as a color of the column (lateral direction on paper surface) including the selected cell is changed, and the delay time periods and the delay occurrence timings in the process 3 of the input unit 203 are displayed in the table 1003.

Graph 1004 illustrates total delay time periods in all of the processes of all units per one day during the display period illustrated in the block 1001 in bar chart. For example, it is found from a bar 1005 that a delay of five minutes in total occurs in the production line 100 on Feb. 11, 2015.

Figure 11:
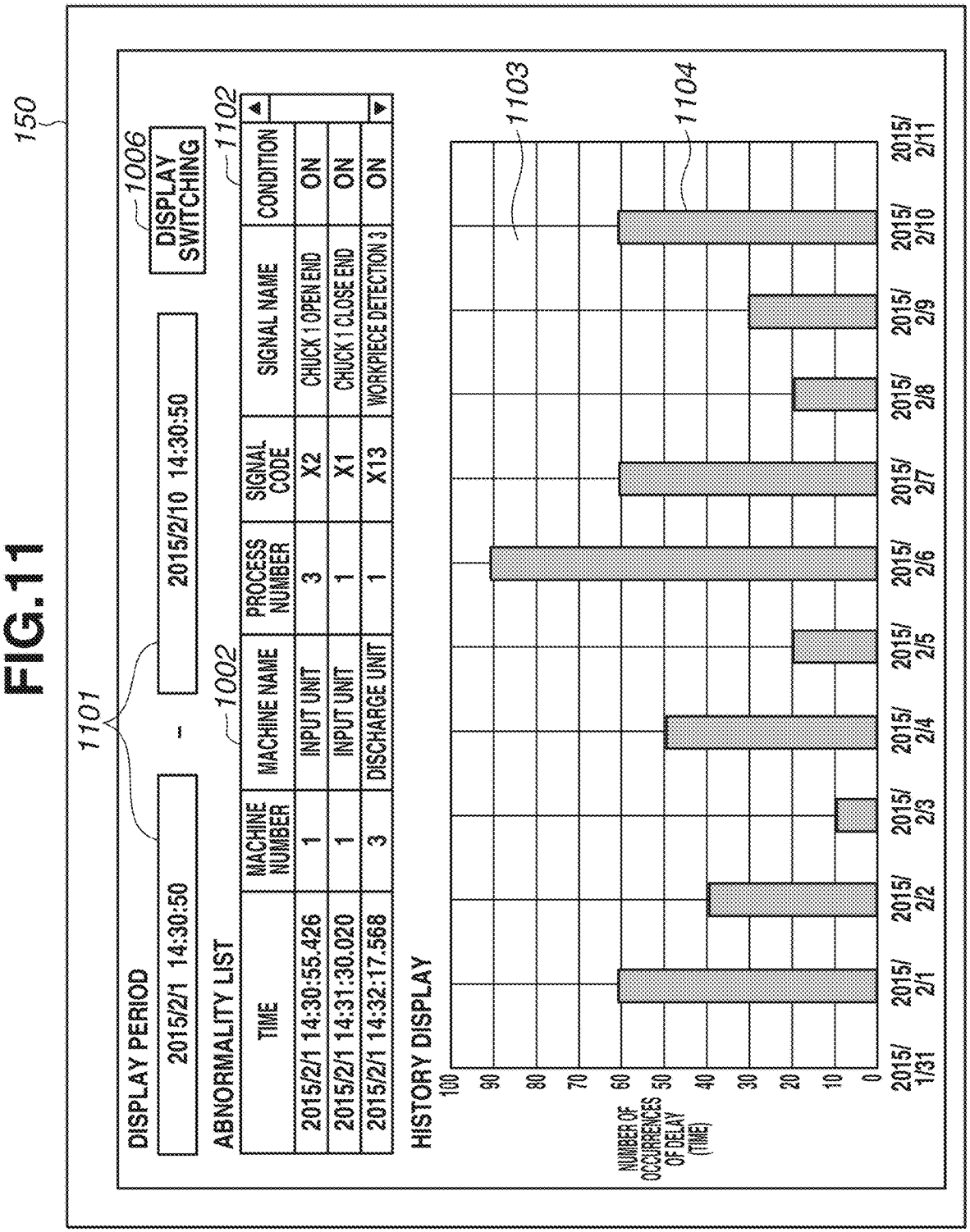
FIG. 11 is a diagram illustrating another example of the screen displayed on the display device by the display unit according to the exemplary embodiment.

FIG. 11 illustrates history of abnormalities occurred during the display period illustrated in the blocks 1101, by the number of occurrences of delay. A screen and a display method can be switched to a screen and a display method illustrated in FIG. 11 with a display switching button 1006. Table 1102 in FIG. 11 illustrates the abnormality history 134 during the display period indicated in the block 1101.

Graph 1103 in FIG. 11 illustrates, in bar chart, the compilation of the number of the occurrences of delay in all of the processes of all the units per one day, from the abnormality history 134. For example, a bar 1104 in FIG. 11 represents that delay occurred 60 times in the production line 100 on Feb. 10, 2015. The worker checks the abnormality history in FIG. 10 and/or FIG. 11 to grasp the abnormality occurrence state.

In the above-described example, the display is switched with the display switching button 1006. Alternatively, the screen may be switched to the display screen in FIG. 11 when a cell of the total number of delays in the table 1002 is selected.

Further, the worker selects the abnormality to be inspected in detail, from the abnormality history of the table 1003 in FIG. 10 or the table 1102 in FIG. 11. For example, in a case where the first row (occurrence time: Feb. 1, 2015 14:30:55) in the table 1003 in FIG. 10 is selected, the screen of the display device 150 shifts to a screen of FIG. 12.

Figure 12:
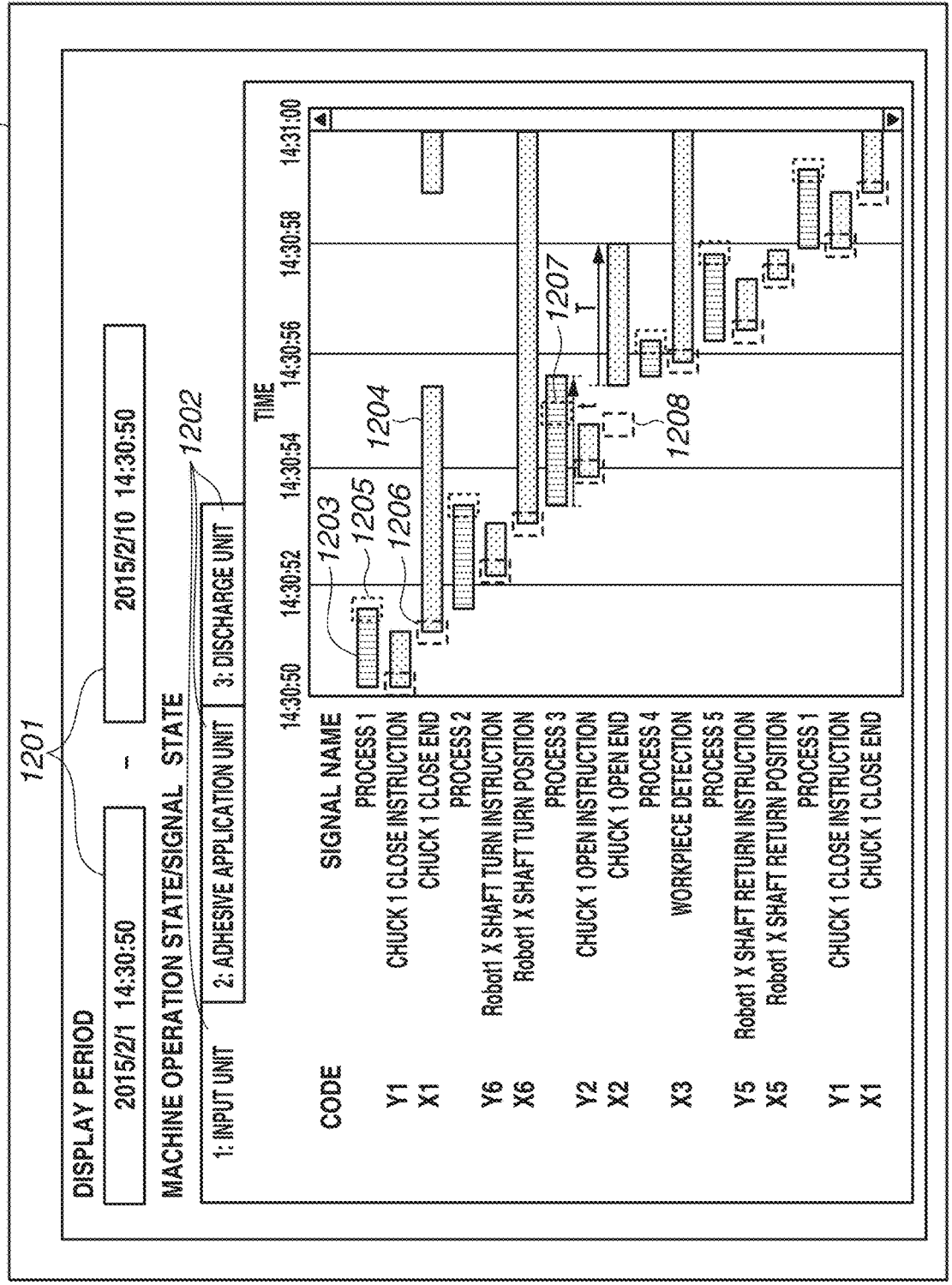
FIG. 12 is a diagram illustrating still another example of the screen displayed on the display device by the display unit according to the exemplary embodiment.

FIG. 12 is a bar chart illustrating the operation states of the processes and the control signals in the respective units, where a lateral axis represents time. In a block 1201 in FIG. 12, a period of 10 seconds in total including 5 seconds before and after the date and time when the abnormality selected in the table 1003 in FIG. 10 occurs is displayed. The time period before and after the time when the abnormality occurred can be set by the worker. The worker can change the display period by operating the block 1201. Tabs 1202 in FIG. 12 are tabs for selecting a unit, the operation states of the respective processes and the respective control signals of which are to be displayed in bar chart.

Figure 13:
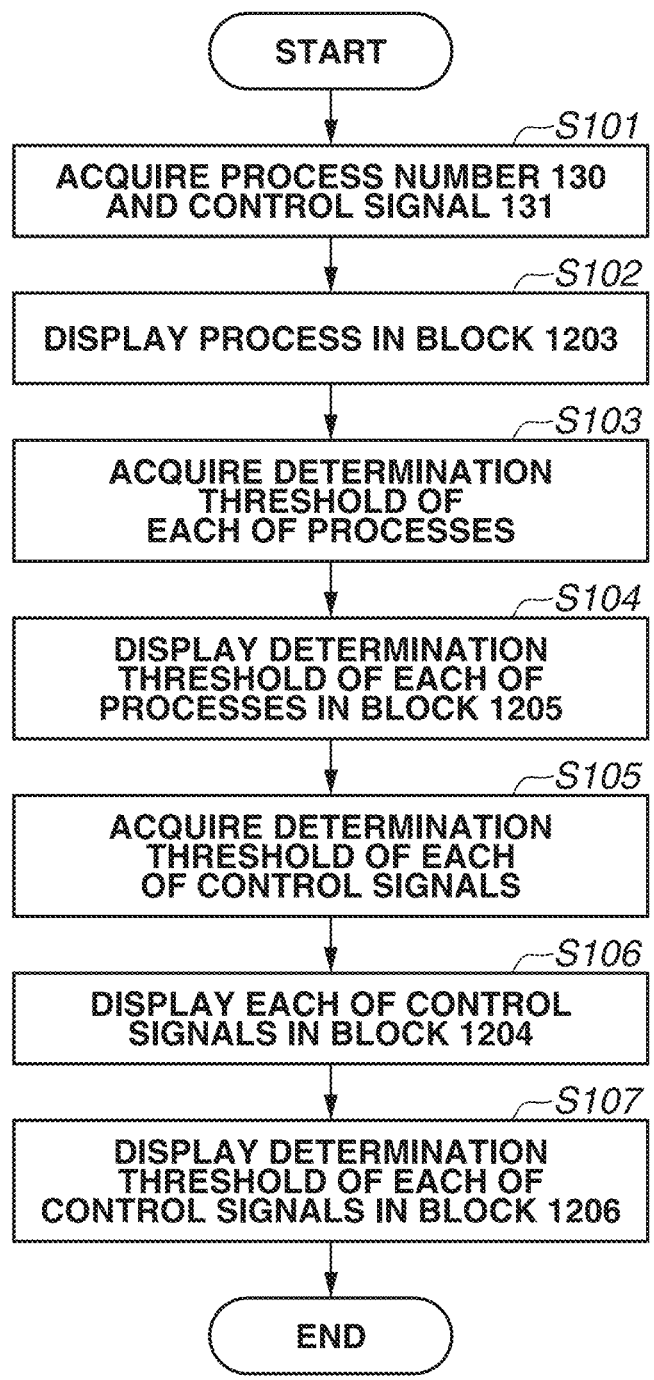
FIG. 13 is a control flowchart of the display unit according to the exemplary embodiment.

Next, a control procedure for displaying the operation states of the processes and the control signals in the respective units in bar chart such as one illustrated in FIG. 12 will be described with reference to FIG. 13. FIG. 13 is a flowchart of the control for displaying the operation states of the processes and the control signals in the respective units in bar chart such as one illustrated in FIG. 12. The processing of the control in FIG. 13 is executed by the CPU functioning as the display unit 126. Further, blocks described below are merely examples, and similar blocks in FIG. 12 have functions similar to the functions described below.

First, in step S101, the process number 130 and the control signal 131 in the display period 1201 in FIG. 12 are acquired from the abnormality history 134. In step S102, periods in which the respective acquired processes operate are displayed as one rectangle, which is represented by a block 1203 in FIG. 12, in order of start time from the top. A portion without a bar (a rectangle or a block) represents that the corresponding process is on standby (0).

Next, in step S103, the determination upper limit value and the determination lower limit value (determination thresholds) for each of the processes are acquired with reference to the determination condition list 133. In step S104, the determination upper limit value and the determination lower limit value are each displayed as a dashed rectangle (block 1205) over the rectangle (block 1203) of the process in the operating state. The width of the dashed rectangle (block 1205) indicates a range used for determining whether the corresponding process is normally ended. Since each of the processes is performed in a predetermined cycle as illustrated in FIG. 8, each of the dashed rectangles is displayed on a time chart so as to appear in the predetermined cycle while maintaining the width of the determination threshold.

Next, in step S105, the control signals used in the respective processes, and the determination upper limit value and the determination lower limit value (determination thresholds) of each of the signals are acquired with reference to the determination condition list 133. In step S106, periods when the respective signals are turned on are each displayed as one rectangle (block 1204), and the blocks 1204 are arranged in order of control in each of the processes from the top, in a manner similar to the processes. A portion without a bar (rectangle, block) represents that the corresponding control signal is on standby (0).

In the present exemplary embodiment, the display pattern of the blocks of the processes and the display pattern of the blocks of the control signals are made different in order to facilitate understanding of the display; however, different display patterns may be used.

Next, in step S107, the determination upper limit value and the determination lower limit value for each of the control signals are each displayed as a dashed rectangle (block 1206) over the rectangle (block 1204) representing the on state of the signal. The width of the dashed rectangle indicates a range used for determining whether the timing when the signal is turned on is normal. Since each of the control signals is generated in a predetermined cycle as illustrated in FIG. 8, each of the dashed rectangles is also displayed on a time chart so as to appear in the predetermined cycle while maintaining the width of the determination threshold. The processing of the display control flowchart is then ended.

In the present exemplary embodiment, a description has been provided of the example in which determination thresholds for the processes and for the control signals are each displayed as the dashed rectangle; however, the display pattern is not limited thereto. For example, the block of each of the processes may be displayed with transmittance higher than transmittance of the block of each of the control signals, or a display pattern may be different from that of the block of each of the control signals.

For example, in a block 1207 and a block 1208 in FIG. 12, a beginning end of a time T with a chuck 1 open end signal (control signal X2) being on does not fall within a normal range (block 1208). Thus, a start timing of the time t in a state where the process 3 relating to the control signal X2 is performing delays, and a finishing end of the time t is out of the normal range (block 1207). This indicates that the control signal X2 and the process 3 are determined to be abnormal.

Figure 14:
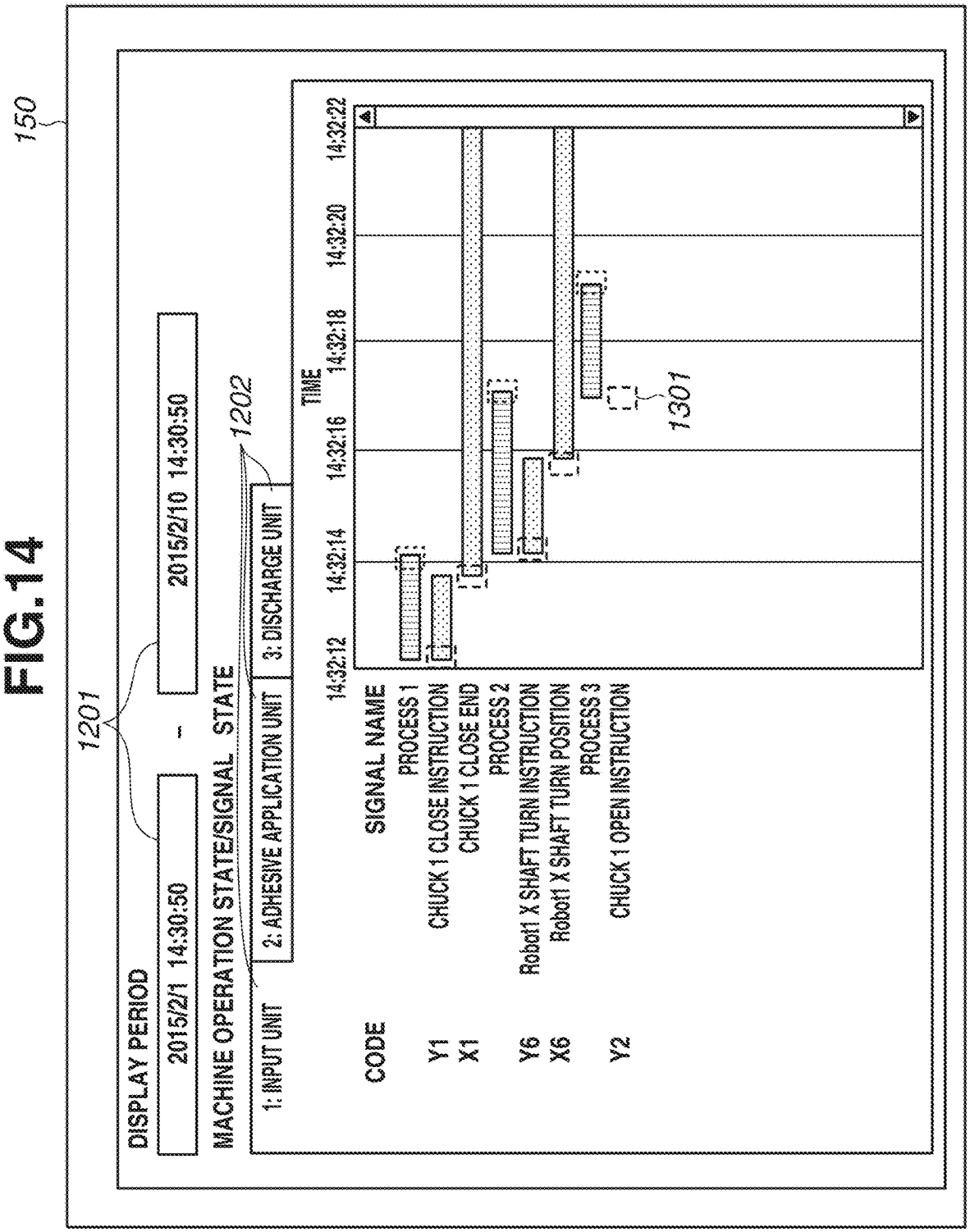
FIG. 14 is a diagram illustrating still another example of the screen displayed on the display device by the display unit according to the exemplary embodiment.

In a case where the third row (time: Feb. 1, 2015 14:32:17) in the table 1102 in FIG. 11 is selected, the screen of the display device 150 shifts to a screen of FIG. 14 similar to the screen of FIG. 12. FIG. 14 is a bar chart illustrating the operation states of the processes and the control signals in the units, where the lateral axis represents time, as in FIG. 12.

Descriptions of the display period, the tabs of the units, and the bar chart of the operation states of the processes and the control signals are similar to the descriptions of FIG. 12. A block 1301 in FIG. 14 illustrates an example of a point at which a sensor for a chuck 1 open instruction signal (control signal Y2) is not turned on and abnormality occurs. With any of the block 1208 in FIG. 12 and the block 1301 in FIG. 14, the abnormality portion, which is out of the normal range, can be recognized at a glance.

Figure 15:
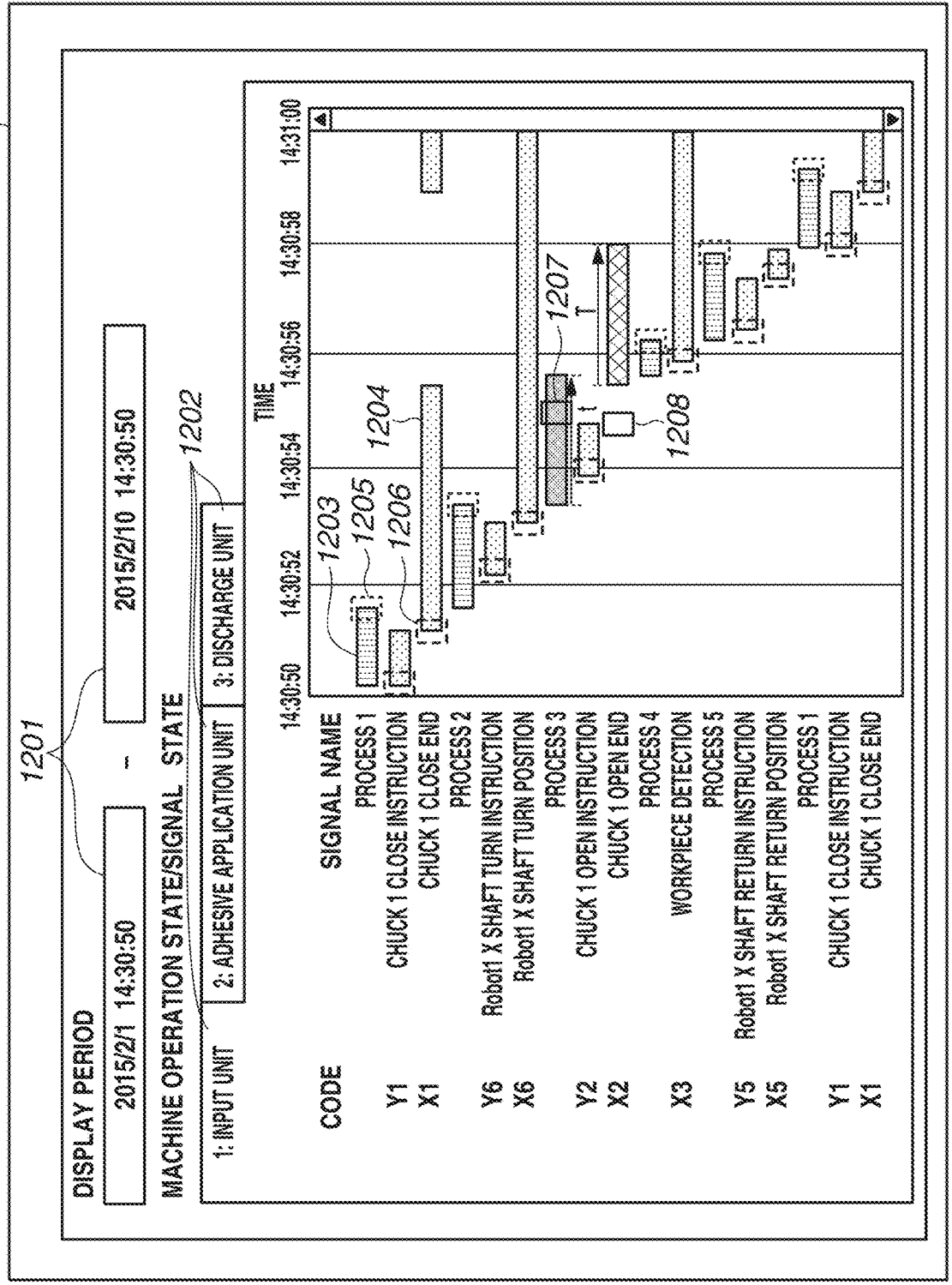
FIG. 15 is a diagram illustrating still another example of the screen displayed on the display device by the display unit according to the exemplary embodiment.

At this time, to further enhance visibility, the control signal with the on timing out of the determination threshold and/or the control signal with the off timing out of the determined threshold, and the determination thresholds relating thereto may be displayed in a pattern, as in FIG. 15, different from the pattern described above. In FIG. 15, the display pattern of each of the process 3, the chuck 1 open end signal (control signal X2), and the blocks 1207 and 1208 is changed. Using colors or display patterns different from those of the normal portion can facilitate recognition.

In the above-described manner, the operation states of the respective units are segmented in process units, the control signals relating to the respective processes are specified, and the processes and the control signals are displayed in order of the control in the time chart. This enables the worker to easily grasp the abnormality occurrence state.

Further, the display pattern of the process and the control signal having abnormality is made different from the display pattern in the normal state, which makes it possible to narrow a range to be checked when the abnormality occurs. Furthermore, a degree of divergence of the on/off timing of the signal from the normal state and the timing when the divergence occurred can be grasped at a glance by following the control signals in a time series manner. This makes it possible to considerably reduce the time to be consumed for specifying abnormality. In addition, even in a case where the number of units, the number of processes, and the number of signals are increased, the monitoring conditions can be automatically set only by operating the production line as usual. This enables construction of the monitoring system with ease.

In the above description, the control method in the exemplary embodiment is specifically executed by the CPU included in the program section of the monitoring apparatus 120. However, a software control program that can execute the above-described functions and a recording medium holding the program may be installed in, for example, another information processing apparatus and implemented. Accordingly, the software control program that can execute the above-described functions, the recording medium holding the program, a communication device, and an application configure the exemplary embodiment of the present disclosure.

The control program to implement the exemplary embodiment of the present disclosure may be recorded in any computer-readable recording medium. Examples of the recording medium to supply the control program include a hard disk drive (HDD), an external storage device, and a recording disk.

Other Embodiments

In the above-described various exemplary embodiments, a description has been provided of the case where each of the units of the production line 100 uses a robot of having a joint that is driven in a single axis; however, the number of joints is not limited thereto. A configuration equivalent to the above-described configuration can be implemented in a robot arm having another type of joint, such as a vertical articulated type and a parallel link type.

Further, the above-described various exemplary embodiments are applicable to a machine that can automatically perform extension, stretch, vertical movement, lateral movement, turning operation, or combined operation thereof, based on information stored in a storage device provided in a control apparatus.

Note that the present disclosure is not limited to the above-described exemplary embodiment, and various modifications can be made within the technical idea of the present disclosure. Further, the effects described in the exemplary embodiment of the present disclosure merely illustrate the most suitable effects obtained from the present disclosure, and the effects by the present disclosure are not limited to the effects described in the exemplary embodiment of the present disclosure.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to exemplary embodiments of the present disclosure, it is possible to easily grasp the operation states of the machine facilities.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-130743, filed Jul. 31, 2020, which is hereby incorporated by reference herein in its entirety.

What is claimed is:

1. An information processing apparatus for displaying a state of a machine facility including a plurality of devices, on a display unit,
   wherein the information processing apparatus displays in a time series on the display unit an operation time for an operation of one predetermined device among the plurality of devices, a first signal that instructs a start of the operation, and a second signal that indicates that the operation has been performed, and
   wherein the information processing apparatus displays a first range including an upper limit value and a lower limit value defining a range of a timing when the first signal is to be output, and a second range including an upper limit value and a lower limit value defining a range of a timing when the second signal is to be output, in a time series on the display unit.

2. The information processing apparatus according to claim 1, wherein the information processing apparatus displays a timing about a start and/or an end of the operation, on the display unit.

3. The information processing apparatus according to claim 1, wherein the information processing apparatus displays the first range over the first signal on the display unit, the second range over the second signal on the display unit, and a third range that is a range of a timing when the operation is to be ended, over the operation time on the display unit.

4. The information processing apparatus according to claim 3,
   wherein the information processing apparatus displays the first signal as a first block on the display unit, displays the second signal as a second block on the display unit, and displays the operation time as a third block on the display unit, and
   wherein the information processing apparatus displays the first range as a fourth block in a display pattern different from a display pattern of the first block on the display unit, displays the second range as a fifth block in a display pattern different from a display pattern of the second block on the display unit, and displays the third range as a sixth block in a display pattern different from a display pattern of the third block on the display unit.

5. The information processing apparatus according to claim 4,
   wherein the information processing apparatus displays the first block, the second block, and the third block in a predetermined pattern on the display unit, and
   wherein the information processing apparatus displays the fourth block, the fifth block, and the sixth block as dashed rectangles on the display unit.

6. The information processing apparatus according to claim 3, wherein the information processing apparatus displays, on the display unit, an operation time with an end timing out of the third range and an operation time with an end timing within the third range in different display patterns.

7. The information processing apparatus according to claim 3, wherein the information processing apparatus displays the first signal with an output timing out of the first range and the first signal with an output timing within the first range, in different display patterns on the display unit.

8. The information processing apparatus according to claim 3, wherein the information processing apparatus records, as abnormalities, an operation time with an end timing out of the third range and the second signal with an output timing out of the second range.

9. The information processing apparatus according to claim 3, wherein the information processing apparatus is able to set a display period of the time series.

10. The information processing apparatus according to claim 1, wherein the information processing apparatus acquires the operation time based on a timing when the first signal is output and a timing when the second signal is output.

11. The information processing apparatus according to claim 1, wherein the information processing apparatus displays the signals with an actual name of a corresponding device of the plurality of devices on the display unit.

12. The information processing apparatus according to claim 1, wherein the machine facility performs predetermined works using the plurality of devices in a predetermined cycle.

13. The information processing apparatus according to claim 1, wherein the information processing apparatus displays information about a delay in the operation time on the display unit.

14. The information processing apparatus according to claim 13, wherein the information about the delay includes at least one of a delay time, a number of occurrences of delays, and a delay occurrence timing.

15. The information processing apparatus according to claim 14, wherein the information processing apparatus displays at least one of the delay time, the number of occurrences of delays, and the delay occurrence timing in a table format on the display unit.

16. The information processing apparatus according to claim 13, wherein the information processing apparatus displays a total time of the delay time or the number of occurrences of delays in a bar chart on the display unit.

17. The information processing apparatus according to claim 16, wherein a first screen on which the total time is displayed in the bar chart on the display unit and a second screen on which the number of occurrences of delays is displayed in the bar chart on the display unit are switchable.

18. The information processing apparatus according to claim 1, wherein the display unit is a touch panel.

19. A production system comprising:
the information processing apparatus according to claim 1; and
the machine facility.

20. A method of manufacturing an article by using a production system, the method comprising:
displaying a state of a machine facility including a plurality of devices, on a display unit,
wherein an operation time for an operation of one predetermined device among the plurality of devices, a first signal that instructs a start of the operation, and a second signal that indicates that the operation has been performed are displayed in a time series on the display unit, and
wherein a first range including an upper limit value and a lower limit value defining a range of a timing when the first signal is to be output, and a second range including an upper limit value and a lower limit value defining a range of a timing when the second signal is to be output are displayed in a time series on the display unit.

21. A method of controlling an information processing apparatus, the method comprising:
displaying a state of a machine facility including a plurality of devices, on a display unit,
wherein an operation time for an operation of one predetermined device among the plurality of devices, a first signal that instructs a start of the operation, and a second signal that indicates that the operation has been performed are displayed in a time series on the display unit, and
wherein a first range including an upper limit value and a lower limit value defining a range of a timing when the first signal is to be output, and a second range including an upper limit value and a lower limit value defining a range of a timing when the second signal is to be output are displayed in a time series on the display unit.

22. A non-transitory computer-readable recording medium storing executable instructions, which when executed by one or more processors of an information processing apparatus, cause the information processing apparatus to:
display a state of a machine facility including a plurality of devices, on a display unit,
wherein an operation time for an operation of one predetermined device among the plurality of devices, a first signal that instructs a start of the operation, and a second signal that indicates that the operation has been performed are displayed in a time series on the display unit, and
wherein a first range including an upper limit value and a lower limit value defining a range of a timing when the first signal is to be output, and a second range including an upper limit value and a lower limit value defining a range of a timing when the second signal is to be output are displayed in a time series on the display unit.

23. An information processing apparatus that controls a machine facility including a plurality of devices,
wherein the information processing apparatus displays in a time series on the display unit an operation time for an operation of one predetermined device among the plurality of devices, a first signal that instructs a start of the operation, and a second signal that indicates that the operation has been performed, and
wherein the information processing apparatus displays a first range including an upper limit value and a lower limit value defining a range of a timing when the first signal is to be output, and a second range including an upper limit value and a lower limit value defining a range of a timing when the second signal is to be output, in a time series on the display unit.

* * * * *